US009998723B2

(12) United States Patent
Supikov et al.

(10) Patent No.: US 9,998,723 B2
(45) Date of Patent: Jun. 12, 2018

(54) FILLING DISPARITY HOLES BASED ON RESOLUTION DECOUPLING

(71) Applicant: Intel Corporation, Santa Clara, CA (US)

(72) Inventors: Alexey M. Supikov, San Jose, CA (US); Maha El Choubassi, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 486 days.

(21) Appl. No.: 14/607,355

(22) Filed: Jan. 28, 2015

(65) Prior Publication Data

US 2016/0227187 A1 Aug. 4, 2016

(51) Int. Cl.
H04N 13/00 (2018.01)
(52) U.S. Cl.
CPC . H04N 13/0022 (2013.01); *H04N 2013/0081* (2013.01)
(58) Field of Classification Search
CPC ....... H04N 13/0011; H04N 2013/0081; H04N 13/0022
See application file for complete search history.

(56) References Cited

U.S. PATENT DOCUMENTS

| 2006/0066612 A1* | 3/2006 | Yang ............... G06L 15/205 345/419 |
| 2009/0016603 A1* | 1/2009 | Rossato ............. G06L 7/194 382/173 |
| 2014/0009462 A1* | 1/2014 | McNamer ........... G06T 19/20 345/419 |
| 2014/0198977 A1* | 7/2014 | Narasimha .......... G06T 5/007 382/154 |
| 2015/0249812 A1* | 9/2015 | Tsubaki ............ H04N 13/0022 348/43 |

OTHER PUBLICATIONS

Mei et al., "On Building an Accurate Stereo Matching System on Graphics Hardware"; Samsung Advanced Institute of Technology, China Lab; LIAMA-NLPR, Institute of Automation, Chinese Academy of Sciences; Computer Vision Workshops (ICCV Workshops), 2011 IEEE International Conference; Nov. 6-13, 2013;8 pages.

Vazquez et al., "Stereoscopic Imaging: Filling Disoccluded Areas in Depth Image-Based Rendering"; Advanced Video Systems, Communications Research Centre, Ottawa, Ontario, Canada; Proc. of SPIE vol. 6392 63920D-2; Downloaded From: http://proceedings.spiedigitallibrary.org/ on Jan. 13, 2015 Terms of Use: http://spiedl.org/terms; 12 pages.

(Continued)

*Primary Examiner* — William A Beutel
(74) *Attorney, Agent, or Firm* — Green, Howard & Mughal LLP

(57) ABSTRACT

Techniques related to filling hole regions in a disparity map are discussed. Such techniques may include generating approximated disparity values for grid nodes of an approximation grid having a lower resolution than the disparity map based on disparity values within outer hole contour regions circumscribing the hole regions. The hole regions may be filled with upsampled disparity values based on the approximated disparity values to provide a final disparity map.

25 Claims, 11 Drawing Sheets

(56) References Cited

OTHER PUBLICATIONS

Yang et al. "Depth Hole Filling Using the Depth Distribution of Neighboring Regions of Depth Holes in the Kinect Sensor", Department of Electronic Engineering, School of Engineering, Sogang University, Seoul, Republic of Korea; 2012 IEEE, pp. 658-661 (4 pages).
Stefanoski et al., "Automatic View Synthesis by Image-Domain-Warping"; IEEE Transactions on Image Processing, vol. 22, No. 9, Sep. 2013; pp. 3329-3341; 13 pages.
Levin et al., "Colorization using Optimization"; Proceeding Siggraph '04 ACM Siggraph 2004 Papers; ACM New York, NY, USA, 2004; pp. 689-694 (6 pages).
Hirschmuller, "Stereo Processing by Semiglobal Matching and Mutual Information"; IEEE Transactions on Pattern Analysis and Machine Intelligence, vol. 30, No. 2, Feb. 2008; pp. 328-341 (14 pages).
Perez et al., "Poisson Image Editing"; Microsoft Research UK, 2003 ACM; pp. 313-318 (6 pages).
Liu et al., "Content-Preserving Warps for 3D Video Stabilization"; Computer Sciences Department, University of Wisconsin-Madison; Adobe Systems Inc; To appear in the ACM Siggraph conference proceedings; 9 pages.

\* cited by examiner

FILLING DISPARITY HOLES BASED ON RESOLUTION DECOUPLING

BACKGROUND

In stereo vision systems, three-dimensional (3D) information may be extracted from multiple two-dimensional (2D) images such as digital images. For example, images from a scene obtained from two or more vantage points (e.g., horizontally aligned vantage points) may be compared to determine disparity information (e.g., distances between positions of the same image regions in the two images) for the scene. Such disparity information may be provided via a disparity map including disparity information for positions within the images, for example. Furthermore, such disparity information may be used to generate a depth map indicating relative depth information for objects in the scene or the like In some examples, such disparity maps may include holes or hole regions where the technique used to generate the disparity map may fail to produce a valid result. For example, a disparity map may be generated based on a comparison of image regions within the source images using a selected error measure such as a sum of absolute differences, a least squares measure, or the like. Failures to produce valid results using such techniques may occur at occlusions (e.g., cases when an object visible in one input image is hidden by another object in the other input image) or mismatches (e.g., cases where there are large areas indistinguishable by the chose error measure such that no image region matches are made during the disparity match generation) or the like. Such failures to produce valid results may be relatively common in practice as large areas of uniform color (e.g., a large gray wall or a clear blue sky or the like) make image region matching difficult.

Holes or hole regions in disparity maps may result in unacceptable visual experiences from applications and image processing that use such disparity maps having such holes or hole regions. For example, in digital photography applications, disparity maps may be used for layer or segmentation effects, parallax view creation, re-focusing, or the like. If such applications use disparity maps having holes or hole regions, unacceptably poor visual results may occur.

In some implementations, such holes or hole regions in an initial disparity map may be filled to generate a final disparity map free of holes or hole regions. However, current techniques for filling disparity map holes may lack quality (e.g., lacking smooth transitions from hole boundaries to hole interiors, providing noticeable patches, blocky or grainy results, or the like) or they may be computationally expensive.

It is with respect to these and other considerations that the present improvements have been needed. Such improvements may become critical as the desire to provide and utilize high quality disparity maps becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
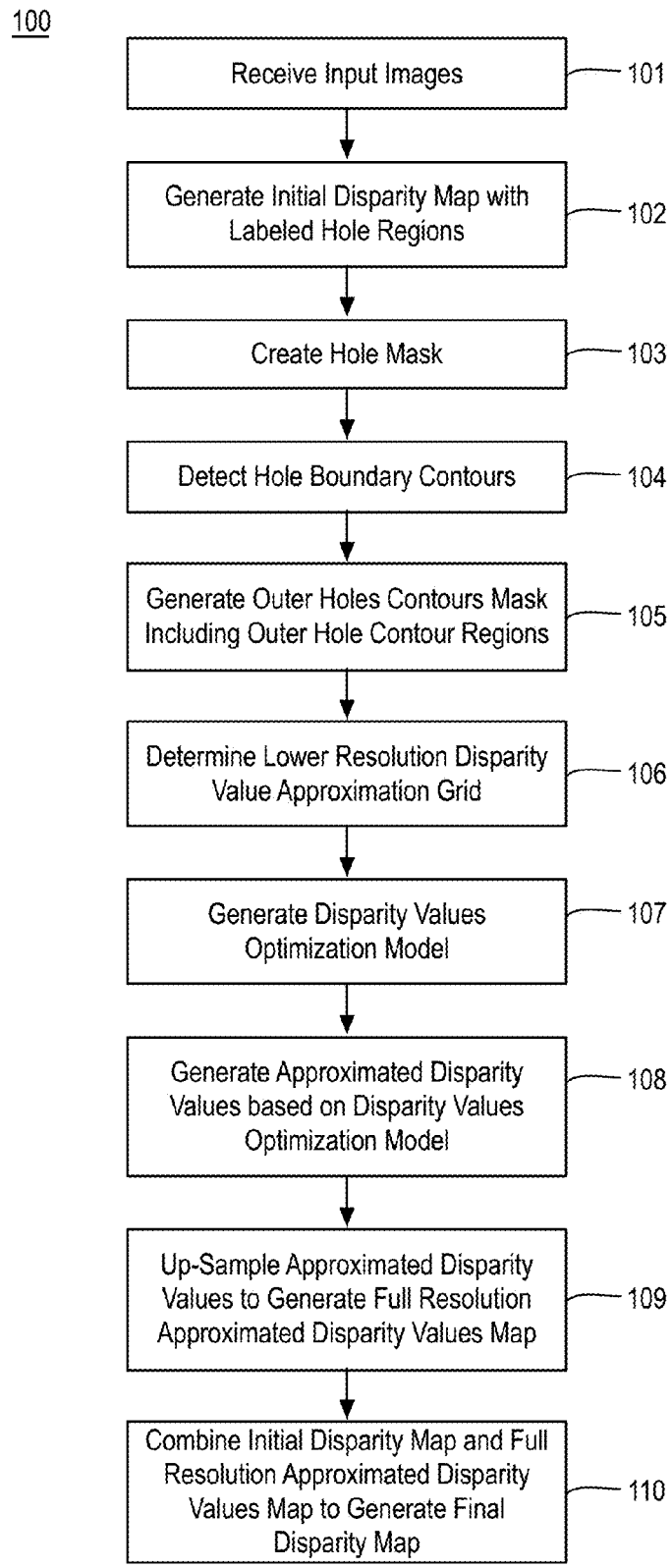
FIG. 1 illustrates an example process for generating a disparity map without hole regions.

One or more embodiments or implementations are now described with reference to the enclosed figures. While specific configurations and arrangements are discussed, it should be understood that this is done for illustrative purposes only. Persons skilled in the relevant an will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to filling holes or hole regions in disparity maps and, in particular, to filling such holes based on resolution decoupling and/or based on contour hole regions circumscribing the hole regions.

As described above, in stereo vision systems, 3D information may be extracted from 2D input images. For example, the 3D information may include a disparity map or the like. In some examples, the disparity map may include holes or hole regions that include pixels for which the disparity map does not have valid results. For example, the technique used to generate the disparity map may fail to produce valid results at such pixel positions and the positions may instead be labeled as holes. Such holes or hole regions may result in unacceptable visual experiences for applications and image processing processes that use such disparity maps for layer or segmentation effects, parallax view creation, re-focusing, or the like. For example, the disparity map may be provided as a part of an image pipeline and other applications may use the disparity map in image processing. In such contexts, disparity maps having the discussed holes or hole regions may provide unacceptable results.

In some embodiments discussed herein, filling holes in disparity maps may include providing, for an initial disparity map having one or more hole regions, a disparity value approximation grid having a lower resolution than the initial disparity map. For example, if the initial disparity map is at a pixel resolution, the disparity value approximation grid may include nodes (e.g., points at which the grid lines cross) separated by two to 20 pixels or the like. Approximated disparity values may be generated for grid nodes within the hole regions of the disparity map based on a disparity filtering technique. For example, grid nodes within the hole regions and those grid nodes adjacent to or within a vicinity of the edges of the hole regions may be included in a non-linear disparity values optimization model (e.g., a disparity filtering model) having disparity values at those grid nodes as unknowns. Such a disparity values optimization model may attempt to minimize the cost of the disparity values based on the cost system to generate the disparity values at the grid nodes (e.g., approximated disparity values) included in the system.

For example, the disparity values optimization model may have a disparity difference cost component (e.g., to measure the difference between the disparity values at the grid nodes and the known disparity values in outer hole contour regions circumscribing the hole regions) and a smoothness component (e.g., to measure the smoothness of the disparity values at the grid nodes such that the determined values do not become too discontinuous and cause patchy or unnatural results or the like). The disparity values determined for the grid nodes by optimizing the discussed disparity values optimization model may be upsampled (e.g., to the resolution of the disparity map) and inserted into the disparity map to generate a final disparity map without holes and with high quality disparity values filling the hole regions of the initial disparity map.

Such techniques of providing the disparity filtering technique on a lower resolution grid (e.g., the disparity value approximation grid) may provide high quality disparity value results, efficient processing, and limited computation complexity. Furthermore, the compromise between disparity value result quality and computation complexity may be selected or predetermined based on the resolution of the disparity value approximation grid.

FIG. 1 illustrates an example process 100 for generating a disparity map without hole regions, arranged in accordance with at least some implementations of the present disclosure. Process 100 may include one or more operations 101-110 as illustrated in FIG. 1. Process 100 may be performed by a device (e.g., device 1300 or any other devices or system discussed herein) or portions of process 100 may be performed by a device to generate disparity maps or portions thereof without hole regions. Process 100 or portions thereof may be repeated any number of times for any number of input images, disparity maps, portions of disparity maps, or the like.

As shown, process 100 may begin at operation 101, "Receive Input Images", where two or more input images may be received for processing. For example, two or images of a scene may be received such that the images are obtained from different vantage points. The input images may include any suitable image data representing an image of a scene and may be in any suitable format. For example, the input images may include images of any suitable scene. The input images may be received or obtained from multiple cameras, a camera array, or the like. Furthermore, information associated with the multiple cameras or camera arrays such as their relative positions or the like may be received such that 3D information such as depth information may be determined for the input images. In other examples, the input images may be received from a memory, a remote computing device, a cloud storage, or the like. In some examples, the input images may be generated internally via the device performing process 100.

Figure 2:
FIG. 2 illustrates an example input image.

FIG. 2 illustrates an example input image 200, arranged in accordance with at least some implementations of the present disclosure. As shown in FIG. 2, input image 200 may include image data representing a scene 201. In the illustrated example, scene 201 is of a break room counter, sink, faucet, cabinetry, back wall, etc. However, scene 201 may be any suitable scene including outdoor scenes, scenes including people, and so on. Also, as discussed, at operation 101, multiple input images for a scene may be received. For example, a second input image (not shown) of scene 201 taken from a different vantage may be received at operation 101.

Returning to FIG. 1, processing may continue at operation 102, "Generate Initial Disparity Map with Labeled Hole Regions", where an initial disparity map with labeled hole regions may be generated. The initial disparity map may be generated using any suitable technique or techniques. For example, the initial disparity map may be generated using any disparity estimation technique. For example, image regions of the input images received at operation 101 may be compared and processed via a selected error measure such as a sum of absolute differences, a least squares measure, or the like to recognize like image regions between the input images. Disparities (e.g., offsets as measured by pixels) may then be determined for the matched image regions. Such disparities may be provided in a disparity map and, furthermore, for image regions or pixels or the like for which no valid match is found or no valid disparity value(s) may be determined, holes or hole regions may be provided. For example, such holes or hole regions may be labeled within the disparity map using any suitable label or indicator such as a value of 0 or the like.

For example, a disparity map, D(x,y), may include disparity values, D, as pixel offset values for each point, (x,y), within the image space. For holes or hole regions, the disparity values may be provided as a value of zero, a reserved value (e.g., zero or any other value), or labeled with a suitable value or indicator, or the like, such that holes or hole regions may be identified within the disparity map. In other examples, holes or hole regions within the disparity map may be identified based on a hole region mask or a confidence map or the like.

As discussed, process 100 may begin at operation 101 and an initial disparity map may be generated at operation 102. In other examples, process 100 may begin by receiving an initial disparity map from another device, a memory device, a cloud storage, or the like. In such examples, process 100 may begin by receiving the initial disparity map and continue at operation 103 as discussed below.

Figure 3:
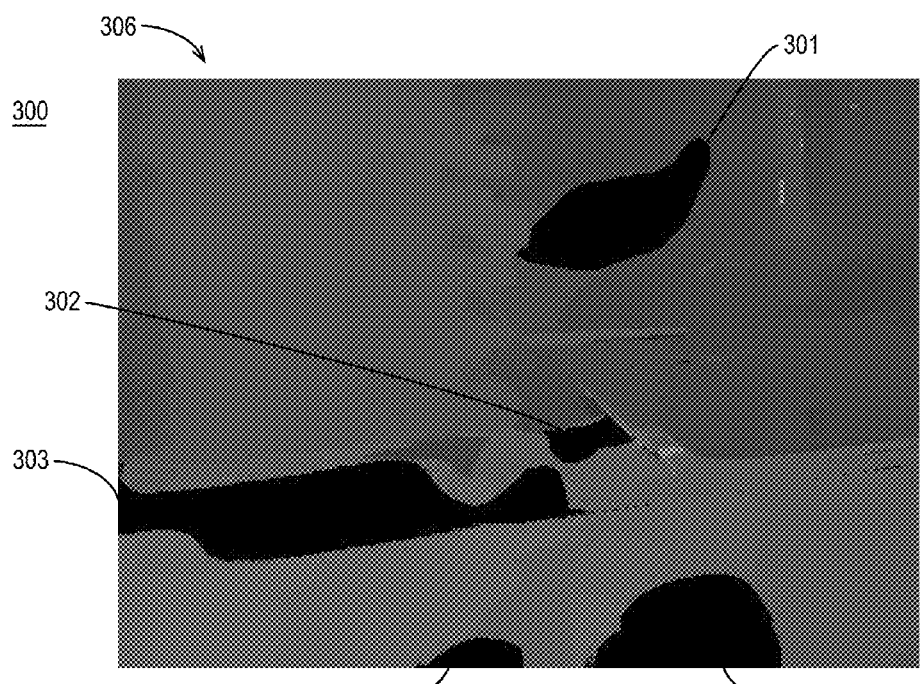
FIG. 3 illustrates an example initial disparity map.

FIG. 3 illustrates an example initial disparity map 300, arranged in accordance with at least some implementations of the present disclosure. As shown in FIG. 3, initial disparity map 300 may include disparity values 306 illustrated in initial disparity map 300 as grayscale values. Disparity values 306 may include any suitable values such as 8-bit values or floating point values or the like and may include any suitable range of values. As also shown in FIG. 3, initial disparity map 300 may include hole regions 301-305 labeled as having values of zero or as black in FIG. 3. For example, as shown with respect to FIGS. 2 and 3, the generation of initial disparity map 300 may include difficulties in finding matches for patches or areas of uniform color such as the back wall of scene 201 (e.g., as associated with hole region 301), the drawer front of scene 201 (e.g., as associated with hole region 305), and so on. Although not illustrated with respect to FIGS. 2 and 3, hole regions may also be associated with occlusions within an input image (e.g., cases when an object visible in one input image is hidden by another object in the other input image), or other causes. Oftentimes, such hole regions 301-305 may be connected regions as shown with respect to FIG. 3 (e.g., only in rare cases are hole regions smaller spots interspersed among initial disparity map 300).

Returning to FIG. 1, processing may continue at operation 103, "Create Hole Mask", where a hole mask may be generated or determined based on the initial disparity map. For example, a hole mask, H, may be generated based on the hole labels or designated hole values discussed with respect to operation 103. In an example, hole mask, H, may include values of zero outside of hole regions such as hole regions 301-305 (please refer to FIG. 3) and non-zero values (e.g., such as values of 1) within hole regions such as hole regions 301-305. However, any suitable values or indicators may be used to indicate and differentiate locations within hole regions and locations outside of hole regions such as hole regions 301-305.

In some examples, the hole mask may include binary values such that values of zero indicate locations outside of hole regions and values of one indicate locations within hole regions such as hole regions 301-305. In other examples, the hole mask may include values of zero for locations outside of hole regions and non-zero values for locations within hole regions. In some examples, such non-zero values may further indicate which hole region the location is associated with. For example, with reference to FIG. 3, hole region 301 may be indicated with a value of one, hole region 302 may be indicated with a value of two, and so on. Such labeling may provide for approximating disparity values within such hole regions based on different disparity value cost models (e.g., a model may be set up for each hole region or subsets of hole regions or the like) as is discussed further herein. In some examples, the hole mask may be received with the disparity map and, in such examples, operation 103 may be skipped.

Figure 4:
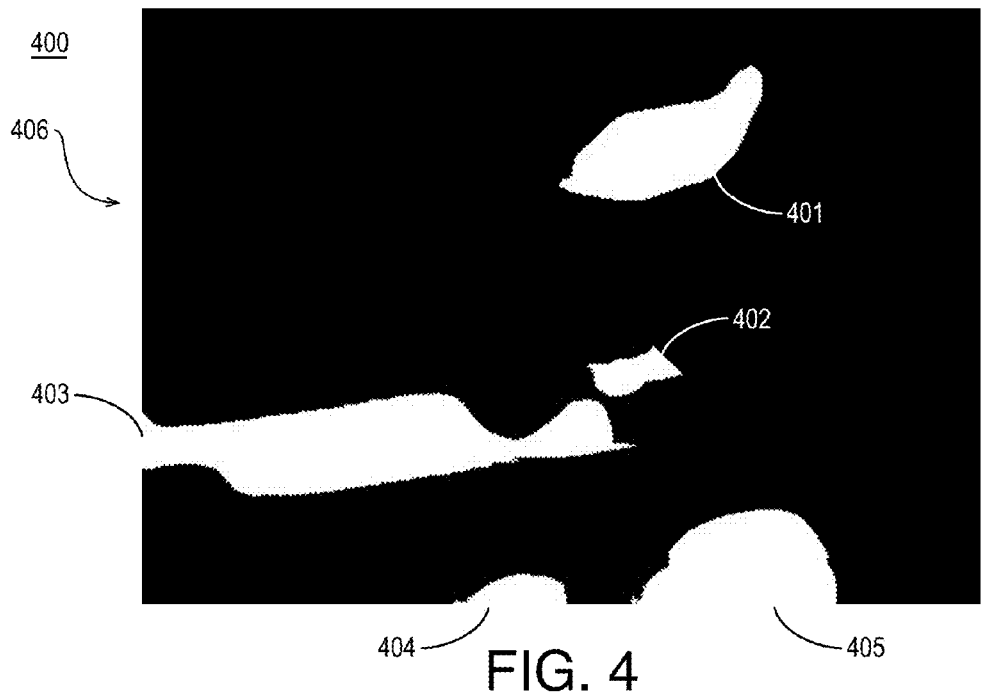
FIG. 4 illustrates an example hole mask.

FIG. 4 illustrates an example hole mask 400, arranged in accordance with at least some implementations of the present disclosure. As shown in FIG. 4, hole mask 400 may include hole mask values 406 (e.g., binary values or indicators in the example of FIG. 4) such that hole regions 401-405 have non-zero values (e.g., indicated as white in FIG. 4) and regions outside of hole regions 401-405 have values of zero (e.g., indicated as black in FIG. 4). However, as discussed with respect to operation 103, hole mask 400 may include any suitable values indicating hole regions 401-405 and regions outside of hole regions 401-405. For example, hole regions 401-405 may have the same non-zero values or they may be different (e.g., to indicate the associated hole region).

Returning to FIG. 1, processing may continue at operation 104, "Detect Hole Boundary Contours", where hole region boundaries for hole regions may be detected. Such hole region boundaries may be detected using any suitable technique or techniques such as determining a boundary of value changes within hole mask 400, contour detection, Canny edge detection, thresholding, or the like. Furthermore, such hole region boundaries may be detected based on any suitable image information such as hole mask 400 and/or initial disparity map 300. For example, a set of contours, C, may be detected such that the set of contours, C, circumscribe the hole regions. The set of contours may be provided in any format such as a series of line segments or curve segments or the like.

Processing may continue at operation 105, "Generate Outer Holes Contours Mask Including Outer Hole Contour Regions", where outer hole contour regions circumscribing the hole regions may be generated. For example, outer hole contour regions may be regions that circumscribe hole regions. Disparity values within such outer hole contour regions may be used to determine approximated disparity values at particular nodes of a disparity value approximation grid as is discussed further herein. For example, disparity values outside of such outer hole contour regions may not be used to determine approximated disparity values. Such outer hole contour regions may be represented or provided using any suitable technique such as an outer holes contours mask or the like.

The outer hole contour regions may be generated using any suitable technique or techniques such that the outer hole contour regions circumscribe (but are not within) hole regions such as hole regions 301-305 (please refer to FIG. 3) and such that outer hole contour regions have a particular pixel width (or approximate pixel width). In some examples, a contour mask (e.g., an outer holes contours mask), O, may be generated that includes the outer hole contour regions. Such a mask may be generated by starting with a zero bitmap such that all values of the bitmap are zero. Each contour of set of contours, C (as discussed with respect to operation 104), may be rendered as a d-pixel wide line or curve onto the zero bitmap such that each position or point belonging to the line or curve is assigned a non-zero value (e.g., such as a value of one). The pixel width, d, may be any suitable non-zero pixel width such as two to four pixels or the like. For example, pixel width, d, may attempt to provide a compromise between too thick of a width that may bring in too many values in the disparity values optimization model discussed herein and too thin of a width that may not provide enough information (e.g., too few values may be provided to the disparity values optimization model).

Subsequent to rendering contour curves, C, any values within hole regions assigned non-zero values may be modified or cleared (e.g., set to zero) based on the hole mask, H. For example, values within hole regions may be assigned to values of one during the discussed counters rendering although the outer hole contour regions are to circumscribe and not be within such hole regions (e.g., they are to tightly circumscribe hole regions such that no pixels are between the outer hole contour regions and the hole regions). The operation of clearing values within the contour mask, O, based on hole mask, H, may clear or zero-out such values. Such clearing may be important as, as is discussed further herein, disparity values within outer hole contour regions are used to generate approximated disparity values and, if such values were not cleared, error values or otherwise assigned values within hole regions may be used in such disparity values approximation causing errors or mistaken approximated values or the like.

Figure 5:
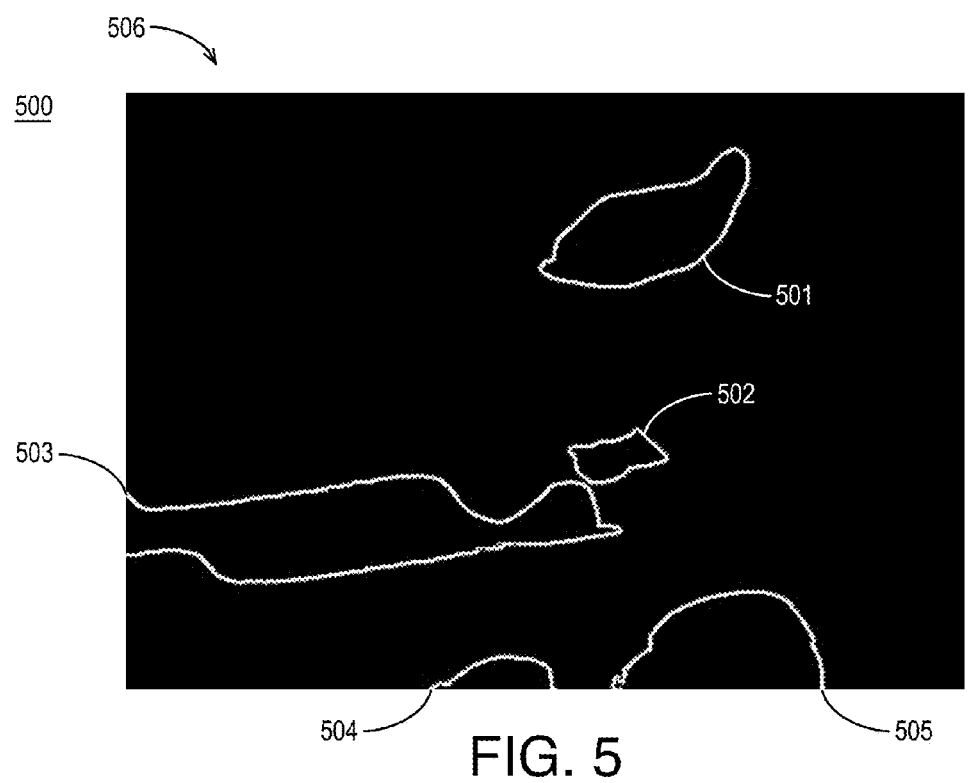
FIG. 5 illustrates an example outer hole contours mask.

FIG. 5 illustrates an example outer holes contours mask 500, arranged in accordance with at least some implementations of the present disclosure. As shown in FIG. 5, outer holes contours mask 500 may include outer holes contours mask values 506 (e.g., binary values or indicators in the example of FIG. 5) such that outer hole contour regions 501-505 have non-zero values (e.g., indicated as white in FIG. 5) and regions outside of outer hole contour regions 501-505 (e.g., whether inside hole regions or not) have values of zero (e.g., indicated as black in FIG. 5). However, outer holes contours mask 500 may include any suitable values indicating outer hole contour regions 501-505 and regions outside of outer hole contour regions 501-505. For example, outer hole contour regions 501-505 may, if overlaid with initial disparity map 300, circumscribe hole regions 301-305.

Returning to FIG. 1, processing may continue at operation 106, "Determine Lower Resolution Disparity Value Approximation Grid", where a lower resolution disparity value approximation grid may be determined. For example, the disparity value approximation grid may provide node locations (e.g., at positions of intersecting grid lines) where disparity values are going to be approximated. Furthermore, the disparity value approximation grid may have a lower resolution than the initial disparity map such that the computational complexity of determining such approximated disparity values is lessened as compared to determining approximated disparity values at the same resolution as the disparity map. For example, if the initial disparity map includes a pixel resolution, the disparity value approximation grid may include nodes (e.g., points at which the grid lines cross) separated by two to 20 pixels or the like. However, any suitable resolution of disparity value approximation grid. Such resolution decoupling between the disparity value approximation grid and the initial disparity map may offer the advantages of computational savings for example.

Furthermore the resolution of the disparity value approximation grid, the relative resolution between the disparity value approximation grid and the disparity map, or the like may be predetermined, determined based on system parameters, or set by a user. For example, the resolution of the disparity value approximation grid may offer a trade-off between more accurate approximated disparity values with greater computation cost and less accurate approximated disparity values with less computation cost. In some examples, the resolution of the disparity value approximation grid, the relative resolution between the disparity value approximation grid and the disparity map, or the like may be determined based system parameters such that, for example, a lower resolution grid may be used in a power savings mode or when battery power is low or the like or when computational resources are being used for other tasks. In other examples, resolution of the disparity value approximation grid, the relative resolution between the disparity value approximation grid and the disparity map, or the like may be displayed to a user (e.g., via a display device) and a user input may be received (e.g., via an input device) to modify the resolution of the disparity value approximation grid, the relative resolution between the disparity value approximation grid and the disparity map, or the like. For example, a disparity value approximation grid, G(i,j) (e.g., G(i,j)=D($x_i$, $y_j$)), may be determined or provided for initial disparity map, D(x,y).

Figure 6:
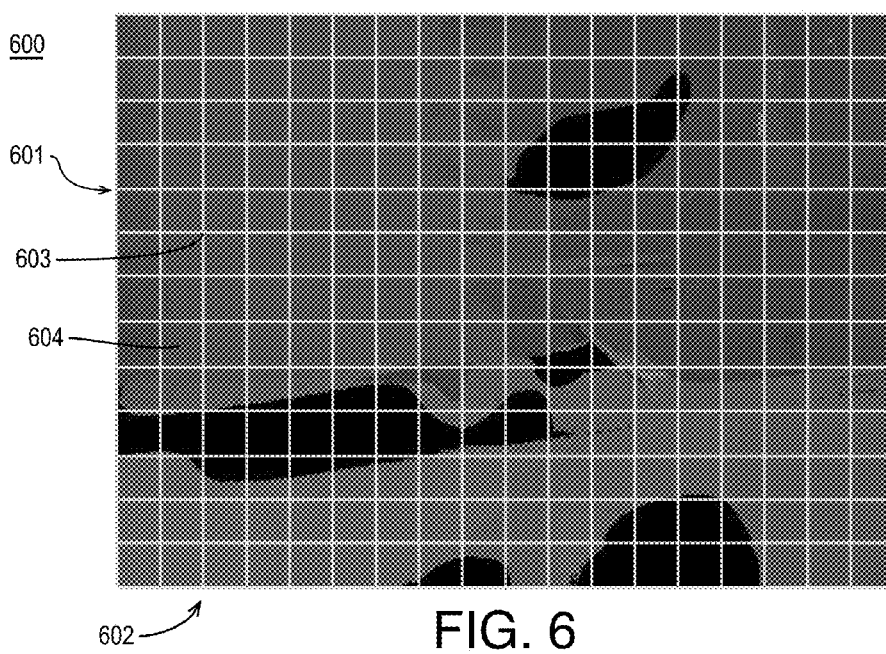
FIG. 6 illustrates an example disparity value approximation grid.

FIG. 6 illustrates an example disparity value approximation grid 600, arranged in accordance with at least some implementations of the present disclosure. As shown in FIG. 6, disparity value approximation grid 600 may include horizontal lines 601, vertical lines 602, and grid nodes 603 at intersections of horizontal lines 601 and vertical lines 602. Furthermore, disparity value approximation grid 600 may include grid cells 604 as regions bounded by horizontal lines 601 and vertical lines 602 and grid nodes 603. For example, the region between two adjacent horizontal lines 601 intersected by two adjacent vertical lines 602 may define a grid cell 604. Furthermore, grid cell 604 may be defined or include four grid nodes 603 (e.g., the grid nodes at the corners of grid cell 604). In the illustration of FIG. 6, only a single gird cell 604 and a single grid node 603 are labeled for the sake of clarity of presentation; however, as shown, disparity value approximation grid 600 may include multiple grid cells and grid nodes as defined by the grid.

As shown, in some examples, disparity value approximation grid 600 may include equally spaced horizontal lines 601 and vertical lines 602 aligned with outer edges of initial disparity map 300 and square grid cells 604. However, any suitable disparity value approximation grid 600 may be provided. For example, the distances between horizontal lines 601 and vertical lines 602 may be different such that grid cells 604 are rectangular in shape. In other examples, the lines of disparity value approximation grid 600 may not be aligned with the outer edges of initial disparity map 300 (e.g., they may not be substantially horizontal and vertical but instead at angles with respect to initial disparity map 300). Furthermore, disparity value approximation grid 600) may include a grid that has grid lines not at right angles or disparity value approximation grid 600) may be a polar coordinate system grid or the like. For example, disparity value approximation grid 600 may be any grid that partitions an initial disparity map into grid cells having grid nodes.

Returning to FIG. 1, processing may continue at operation 107, "Generate Disparity Values Optimization Model", where one or more disparity values optimization model(s) may be generated based on the disparity value approximation grid. For example, the disparity values optimization model may be provided to determine approximated disparity values for particular grid nodes (e.g., selected grid nodes) of the disparity value approximation grid. Furthermore, the disparity values optimization model may use only disparity values within the outer hole contour regions of hole regions (e.g., only disparity values of the disparity map within the outer hole contour regions determined with respect to operations 103-105 or the like may be used in the disparity values optimization model) may be used to determine approximated disparity values for particular grid nodes of the disparity value approximation grid.

Figure 7:
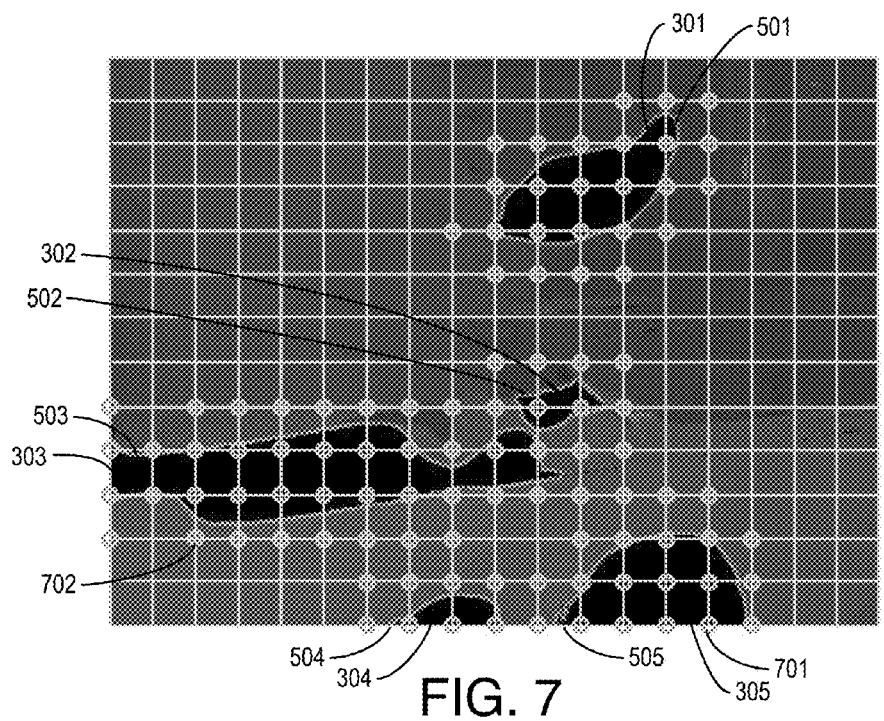
FIG. 7 illustrates example grid nodes to which the disparity values optimization model may be applied and example outer hole contour regions that may be used in the disparity values optimization model.

FIG. 7 illustrates example grid nodes to which the disparity values optimization model may be applied and example outer hole contour regions that may be used in the disparity values optimization model, arranged in accordance with at least some implementations of the present disclosure. As shown in FIG. 7, a disparity values optimization model may be applied to grid nodes including grid nodes 701, 702 (such selected grid nodes are illustrated as labeled with circles in FIG. 7). For example, the disparity values optimization model may be applied to grid nodes 701 that are within hole regions 301-305 (in the example of FIG. 7 only one grid node 701 within hole region 305 is labeled for the sake of clarity of presentation) and to grid nodes 702 that are outside of hole regions 301-305 but within a vicinity of an outer hole contour regions 501-505 (in the example of FIG. 7 only one grid node 702 outside of hole region 303 but within a vicinity to outer hole contour region 503 is labeled for the sake of clarity of presentation). In some examples, grid nodes 702 may be those grid nodes adjacent to any portion of outer hole contour regions 501-505. For example, a grid node may be adjacent to any portion of outer hole contour regions 501-505 if no other grid node is between the grid node and a portion of outer hole contour regions 501-505. In some examples, grid nodes 701, 702 may be grid nodes that surround a grid cell that has any portion of an outer hole contour region intersecting the grid cell.

Figure 8:
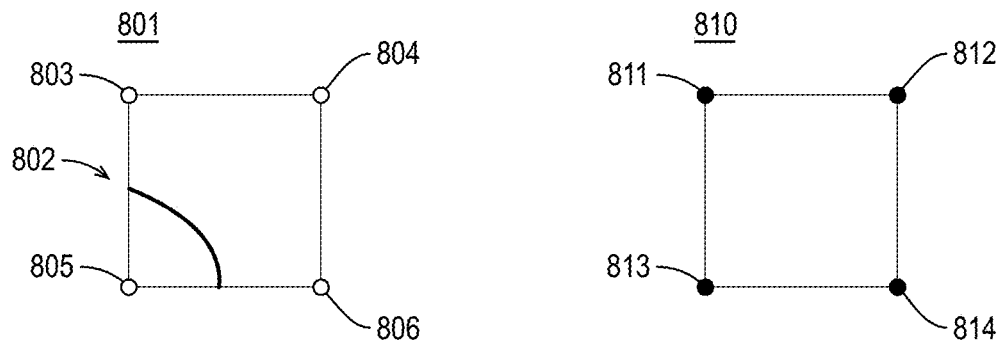
FIG. 8 illustrates an example grid cell with an example outer hole contour region intersection and an example grid cell having no intersection.

FIG. 8 illustrates an example grid cell 801 with an example outer hole contour region 802 intersection and an example grid cell 810 having no intersection, arranged in accordance with at least some implementations of the present disclosure. As discussed, grid nodes adjacent to any portion of an outer hole contour region may be included in a disparity values optimization model or grid nodes that surround a grid cell that has any portion of an outer hole contour region intersecting the grid cell may be included in a disparity values optimization model. A shown in FIG. 8, grid nodes 803-806 of grid cell 801 may be adjacent to an outer hole contour region if any part of grid cell 801 is intersected by outer hole contour region 802. Based on being adjacent to at least a portion of outer hole contour region 802, grid nodes 803-806 (labeled with open circles may be included in a disparity values optimization model). For example, grid nodes 803-806 may be included in the disparity values optimization model since they surround a grid cell intersected by an outer hole contour region. Furthermore, grid cell 801 may be included in the disparity values optimization model (e.g., it may be evaluated as part of the disparity values optimization model) based on the intersection of outer hole contour region 802.

In contrast, grid cell 810 has no outer hole contour region intersection and grid nodes 811-814 (labeled with closed circles in the example of FIG. 8) may not be included in a disparity values optimization model due to the lack of an intersection of an outer hole contour region. It should be noted that any of grid nodes 811-814 may still be included based on intersections (if any) within adjacent grid cells (e.g., grid node 811 may be included if an intersection occurs at any of the grid cell above grid cell 810, the grid cell left of grid cell 810, or the grid cell above and to the left of grid cell 810). Similarly, grid nodes 812-814 may be included if adjacent grid cells have intersections. Furthermore, grid cell 810 may be excluded from the disparity values optimization model based on the intersection of outer hole contour region 802.

Returning to FIG. 7, as discussed, grid nodes may be included in a disparity values optimization model if the grid node is within a hole region or if the grid node is within a vicinity of an outer hole contour region. For example, a disparity values optimization model, E, may be generated with approximated disparity values (e.g., filtered disparity values) $d_{ij}$ at G(i,j) as unknowns in the disparity values optimization model. For example, only selected grid positions (as discussed) may be included as unknowns in the disparity values optimization model. Furthermore, as discussed, such grid positions may be grid positions within hole regions and grid positions within a vicinity of an outer hole contour region. In some examples, an unknown disparity value (e.g., a disparity value to be approximated), $d_{ij}$, may be included in the disparity values optimization model only if the grid node, G(i,j), is close to or within a vicinity of an outer hole boundary. For example, a grid node may be within a vicinity of an outer hole boundary if there is at least one point, (x,y), in the vicinity of G(i,j) such that O(x,y) is non-zero. For example, the four grid cells adjacent to a grid node may be used as the vicinity of G(i,j). However, any suitable vicinity such as a predefined distance or the like may be used.

Furthermore, the disparity values optimization model may be provided based on known disparity values (e.g., from initial disparity map D(x,y)) from outer hole contour regions. For example, known disparity values from regions outside of outer hole contour regions may be excluded from the disparity values optimization model. Such exclusion of disparity values from regions outside of outer hole contour regions may reduce computation complexity and provide increased accuracy. For example, only disparity values within an outer hole contour region may be used to build a disparity difference term of a disparity values optimization model (as is discussed further with respect to Equation (2)). For example, a point (x,y) from a vicinity of a grid node (e.g., vertex), G(i,j), may participant as a coefficient corresponding to G(i,j) only if hole contour mask, O(x,y), is non-zero (e.g., (x,y) is within an outer hole contour region).

Figure 9:
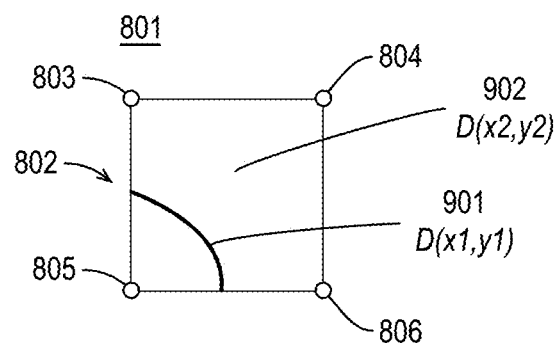
FIG. 9 illustrates an example grid cell, an example outer hole contour region, and example used and unused disparity values.

FIG. 9 illustrates example grid cell 801, example outer hole contour region 802, and example used and unused disparity values, arranged in accordance with at least some implementations of the present disclosure. As discussed, in some examples, only (known) disparity values from the initial disparity map within outer hole contour regions may be used in a disparity values optimization model (while values outside of the hole contour regions may be excluded). As shown in FIG. 9, point 901 (e.g., D(x1,y1)) may be within hole outer hole contour region 802 and point 902 (e.g., D(x2,y2) may be outside of outer hole contour region 802. As discussed, disparity value D(x1,y1) associated with point 901 (along with other disparity values within hole outer hole contour region 802) may be used in a disparity values optimization model and disparity value D(x2,y2) associated with point 902 (along with other disparity values outside of hole outer hole contour region 802) may be excluded. In some examples, such inclusion or exclusion of disparity values may be implemented via hole mask, O(x,y), generated via operation 104 as implemented via Equation (2) for example.

Returning to FIG. 1 at operation 107, the discussed disparity values optimization model may be implemented using any suitable technique or techniques such that unknown disparity values may be determined for participating grid nodes. For example, the disparity values optimization model may be implemented as shown in Equations (1)-(3):

$$E = E_d + \alpha E_s \quad (1)$$

$$E_d = \sum_{n=1}^{N} \sum_{(x,y) \in S_n} O(x, y)(w_{(x,y)}^t d_n - D(x, y))^2 \quad (2)$$

$$E_S = \sum_{n=1}^{N} [(d_{ij} - d_{(i+1)j})^2 + (d_{ij} - d_{i(j+1)})^2 + (d_{(i+1)j} - d_{(i+1)(j+1)})^2 + (d_{i(j+1)} - d_{(i+1)(j+1)})^2] \quad (3)$$

where E may be the disparity values optimization model. $E_d$ may be a disparity difference term, $\alpha$ may be a smoothness weight, and $E_s$ may be a smoothness term. For example, E may represent a quadratic cost in the unknown disparities, $d_{ij}$. Furthermore, $E_d$ may be a term that measures the difference between the approximated disparity values and the known disparity values within outer hole contour regions (e.g., $E_d$ may ensure that the approximated disparity values, $d_{ij}$, are close to the values D(x,y) in the outer hole contour region, O(x,y)). Furthermore, $E_s$ may be a term that measures the smoothness of the approximated disparity values (e.g., $E_s$ may constrain the approximated disparity values, $d_{ij}$, to be smooth and continuous). As shown, the smoothness term may be constrained or weighted by smoothness weight, $\alpha$, which may provide a handle on the desired smoothness of the solution. For example, the smoothness weight, $\alpha$, may be predetermined or selected by a user to weight the smoothness term, $E_s$.

Furthermore, with reference to Equation (2), n may be a grid cell counter variable, N may be the total number of grid cells being evaluated (e.g., having an outer contour hole contour region intersection as discussed with respect to FIG. 8), (x,y) may be coordinates within the disparity map, $S_n$ may be a grid cell, O(x,y) may be a hole mask, w(x,y) may be a weighting vector associated with position (x,y), $d_n$ may be a vector including ordered disparity values for grid nodes of the current grid cell (e.g., $d_n = [d_{ij}, d_{(i+1)j}, d_{i(j+1)}, d_{(i+1)(j+1)}]^t$; such that t is a transpose operation and $d_{ij}$ is the unknown disparity value at the upper left corner of a grid cell), and D(x,y) may be a disparity value at position (x,y). As shown, a dot product of $d_n$ and the transpose of w(x,y) may be taken and differenced with disparity value, D(x,y). For example, in $E_d$, every disparity value, D(x,y), in $S_n$, a neighborhood (e.g., a grid cell in the illustrated example) that intersects with a hole contour, the (unknown) disparity may be estimated as a linear combination of the disparities in $d_n$ (e.g., the dot product of the transpose of w(x,y) and $d_n$). The quadratic estimation error is then provided in $E_d$.

For example, with reference to FIG. 9, grid cell 801 may be a participant grid cell (e.g., a grid cell, n of N), $S_n$. At point 901 (e.g., (x1,y1)) within grid cell, $S_n$, O(x1,y1) may be non-zero (e.g., 1), and D(x1,y1) may be a value associated with that position from initial disparity map 300. Furthermore, $d_n$ may be a vector including the unknown (e.g., implemented as variables in the model)) disparity values at grid nodes 803-806 and vector w(x,y) may be an interpolative weighting vector. For example, at the position of grid node 803, the weighting vector would weight the unknown disparity value at grid node 803 with a value of one and the weighting vector would weight the unknown disparity values at grid nodes 804-806 with values of zero (e.g., w(x,y)=[1,0,0,0]). At the center of grid cell 801, the weighting vector would weight the unknown disparity values at grid nodes 803-806 with values of 0.25 (e.g., w(x,y)=[0.25, 0.25, 0.25, 0.25]). Similarly, at any position within grid cell 801, the weighting vector may provide interpolative weights for the unknown disparity values at grid nodes 803-806.

Furthermore, with reference to Equation (3), n may be a grid cell counter variable, N may be the total number of grid cells being evaluated and, for each grid cell, $d_{ij}$ may be the unknown disparity value at the upper left corner of the grid cell, $d_{(i+1)j}$ may be the unknown disparity value at the upper right corner of the grid cell, $d_{i(j+1)}$, may be the unknown disparity value at the lower left corner of the grid cell, and $d_{(i+1)(j+1)}$ may be the unknown disparity value at the lower right corner of the grid cell. For example, in $E_s$, for each grid cell or neighborhood, $S_n$, a sum is made of the squared difference between the unknown disparities, $d_{ij}$, at adjacent vertices of $S_n$.

In the examples discussed herein and illustrated with respect to Equations (1)-(3), grid cells or neighborhoods are provided as squares or quads or the like. However, the grid cells or neighborhoods may be any suitable size and shape. For example, the grid cells or neighborhoods may be square, rectangular, triangular, or the like. Furthermore, the disparity values optimization model as discussed may provide a non-linear (e.g., quadratic) disparity values cost model including a disparity difference of the approximated disparity values (e.g., $E_d$) and a smoothness of the approximated disparity values (e.g., $E_s$). However, the disparity values optimization model may include disparity differences and disparity smoothness measures using any suitable technique or techniques.

Furthermore, the discussed disparity values optimization model may be generated for an entire initial disparity map or for a portion of an initial disparity map. For example, with reference to FIG. 7, a disparity values optimization model may be built or generated for all of the selected grid nodes such as grid nodes 701, 702 (e.g., those labeled with circles). In other examples, multiple disparity values optimization models may be built or generated for the selected grid nodes.

Figure 10:
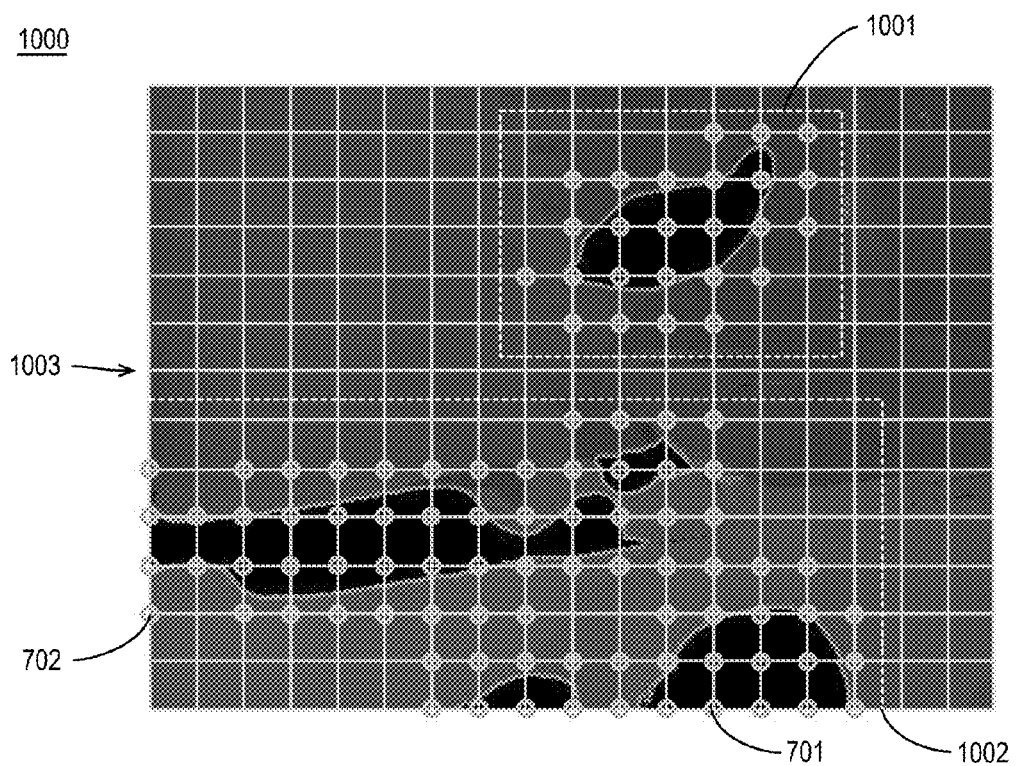
FIG. 10 illustrates an example grid node separation for multiple disparity values optimization models.

FIG. 10 illustrates an example grid node separation 1000 for multiple disparity values optimization models, arranged in accordance with at least some implementations of the present disclosure. As shown in FIG. 10, grid nodes 701, 702 (e.g., grid nodes for which disparity values are to be approximated as discussed herein) may be separated into sections 1001, 1002. For example, a disparity values optimization model as discussed herein may be built or generated for section 1001 and another disparity values optimization model may be built or generated for section 1002. Such disparity values optimization models may be solved separately (and in some examples, in parallel) to generate approximated disparity values as discussed herein. Such techniques may provide for faster operation (as the models may be evaluated in parallel, for example).

Grid node separation 1000 may be performed using any suitable technique or techniques. In the example of FIG. 10, grid node separation 1000 may separate selected grid nodes such as grid nodes 701, 702 into sections 1001, 1002 based on a row of unused grid nodes 1003. For example, sections may be provided if a row (e.g., a continuous line or other shape) of unused grid nodes 1003 separates the sections. In other examples, each hole region may be its own section. In yet other examples, the initial disparity map may be segmented into sections for processing (e.g., the initial disparity map may be halved, quartered, separated into slices, or the like for processing).

Returning to FIG. 1, processing may continue at operation 108, "Generate Approximated Disparity Values based on Disparity Values Optimization Model", where approximated disparity values may be determined or generated based on the disparity values optimization model. For example, the disparity values optimization model may be optimized (e.g., minimized or the like) to generated approximated disparity values. The approximated disparity values may be solved or optimized using any suitable technique or techniques. In some examples, the disparity values optimization model may be solved using a sparse solver based on a conversion of the disparity values optimization model into a corresponding linear problem (e.g., based on a system derived from the non-linear disparity values cost optimization problem). For example, the disparity values optimization model may use a preconditioned conjugate gradient technique. As discussed the result of operation 108 may be approximated disparity values (e.g., a set of values $d_{ij}$ for the grid nodes of the disparity value approximation grid included in the disparity values optimization model). For grid nodes not included in the disparity values optimization model, the values may be set to zero.

Processing may continue at operation 109, "Up-Sample Approximated Disparity Values to Generate Full Resolution Approximated Disparity Values Map", where the approximated disparity values may be upsampled to generate a full resolution approximated disparity values map. For example, the approximated (e.g., or filtered) disparity values, $d_{ij}$, from operation 108 may be upsampled to full resolution (e.g., the resolution of the initial disparity map). The approximated disparity values may be upsampled using any suitable technique or techniques. For example, the approximated disparity values may be upsampled based on an interpolation technique. In some examples, the results may be written to a full resolution approximated disparity values map, F(x,y). For example, full resolution approximated disparity values map, F(x,y), may include values generated based on a bilinear interpolation of values at grid nodes of the grid cell containing point or position (x,y).

Figure 11:
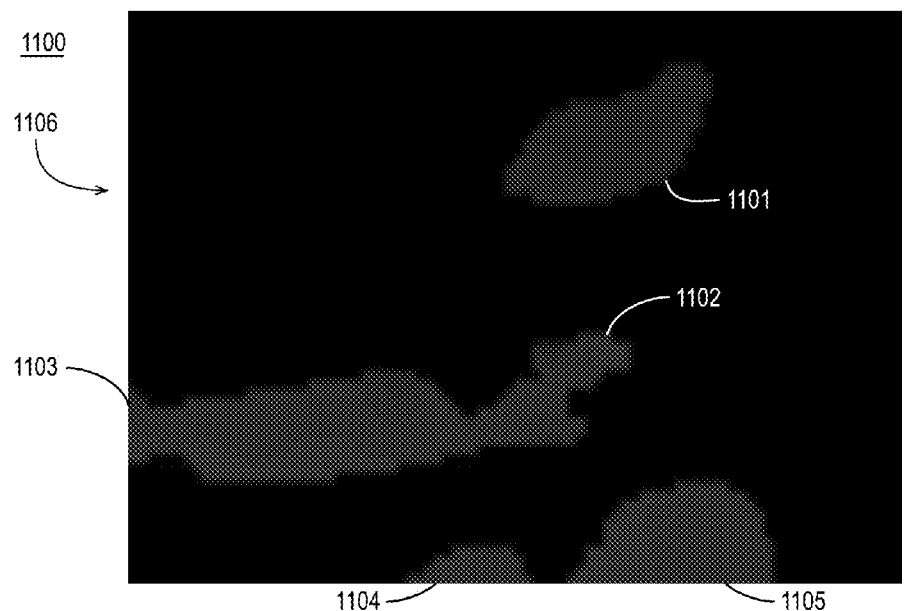
FIG. 11 illustrates an example full resolution approximated disparity values map containing values for filling disparity holes.

FIG. 11 illustrates an example full resolution approximated disparity values map 1100 containing values for filling disparity holes, arranged in accordance with at least some implementations of the present disclosure. As shown in FIG. 11, full resolution approximated disparity values map 1100 may include full resolution approximated disparity values map values 1106 (e.g., full resolution values at the resolution of the initial disparity map) such that hole regions 1101-1105 have non-zero values (e.g., approximated disparity values at full resolution) and regions outside of hole regions 1101-1105 have values of zero (e.g., indicated as black in FIG. 1). For example, hole regions 1101-1105 may include upsampled approximated disparity values upsampled based on the approximated disparity values determined at operation 108.

Returning to FIG. 1, processing may continue at operation 110, "Combine Initial Disparity Map and Full Resolution Approximated Disparity Values Map to Generate Final Disparity Map", where the initial disparity map and the full resolution approximated disparity values map may be combined to generate a final disparity map. For example, the full resolution approximated disparity values within hole regions may replace hole region indicator values to generate the final disparity map. The initial disparity map and the full resolution approximated disparity values map may be combined using any suitable technique or techniques. For example, initial disparity map, D, and full resolution approximated disparity values map, F, may be combined based on hole mask, H, such that a disparity value in initial disparity map, D(x,y), may be set to the value in full resolution approximated disparity values map, F(x,y), if the associated value in hole mask, H(x,y), is non-zero and that a disparity value in initial disparity map, D(x,y), remains unchanged if the associated value in hole mask, H(x,y), is zero.

Figure 12:
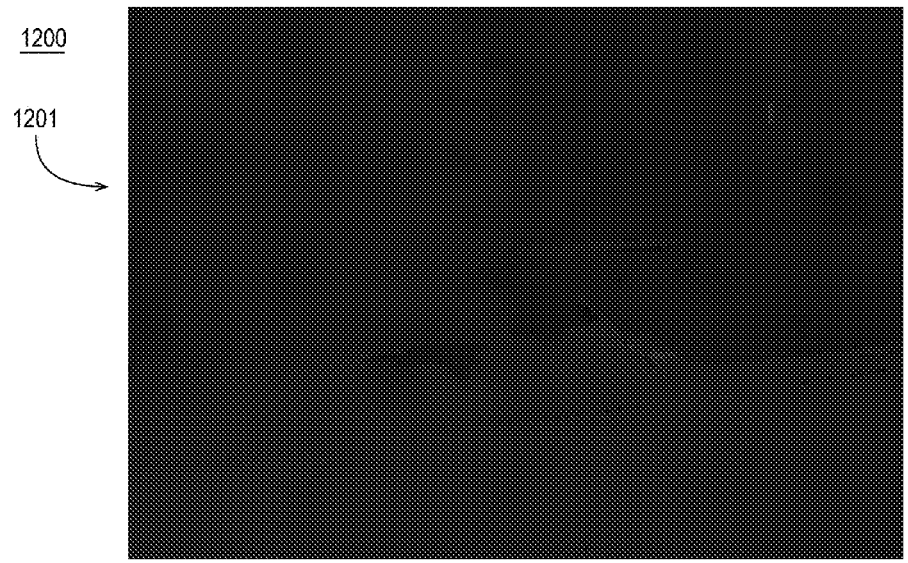
FIG. 12 illustrates an example final disparity values map.

FIG. 12 illustrates an example final disparity values map 1200, arranged in accordance with at least some implementations of the present disclosure. As shown in FIG. 12, full resolution approximated disparity values map 1200 may include full resolution approximated disparity values map values 1201 (e.g., full resolution values at the resolution of the initial disparity map) such that hole regions have been filled with upsampled approximated disparity values (please refer to FIG. 11). It is noted that final disparity values map 1200 may contain values that are difficult to provide visually and/or to adjust to provide a suitable visual presentation. However, as discussed herein, final disparity values map 1200 may include full resolution approximated disparity values map values 1201 generated as discussed herein based on combining initial disparity map 300 and full resolution approximated disparity values map 1100. Final disparity values map 1200 may provide for valid values at all positions of final disparity values map 1200. Furthermore, the discussed upsampled approximated disparity values within final disparity values map 1200 may provide for high quality results that offer smooth transitions. When used in image processing applications such as applications providing segmentation effects, computational photography applications, parallax view creation applications, re-focusing applications, imaging effects applications, or the like, full resolution approximated disparity values map 1200 provides high quality and visually appealing results.

As discussed, process 100 may be used to generate a final disparity map based on two or more input images or based on an input initial disparity map. Process 100 or portions thereof may be repeated to generate multiple final disparity maps or to produce partial final disparity maps for sections of initial disparity maps. Such partial final disparity maps may be generated in parallel based on multiple disparity values optimization models, for example, and they may be combined to form a final disparity map. Furthermore, one or more of operations 101-110 may be skipped or combined in various embodiments. For example, operations 109 and 110 may be performed simultaneously in some embodiments. Furthermore, hole masks such as hole mask, H, and/or outer contour masks such as outer contour mask, O, may not be explicitly determined in their entireties. For example, such masks may be determined on-the-fly as needed. Furthermore, the disparity values optimization model discussed herein may include one or more additional terms such as a saliency term (e.g., to determine whether an approximated disparity value stands out relative to its neighbors) or the like.

Figure 13:
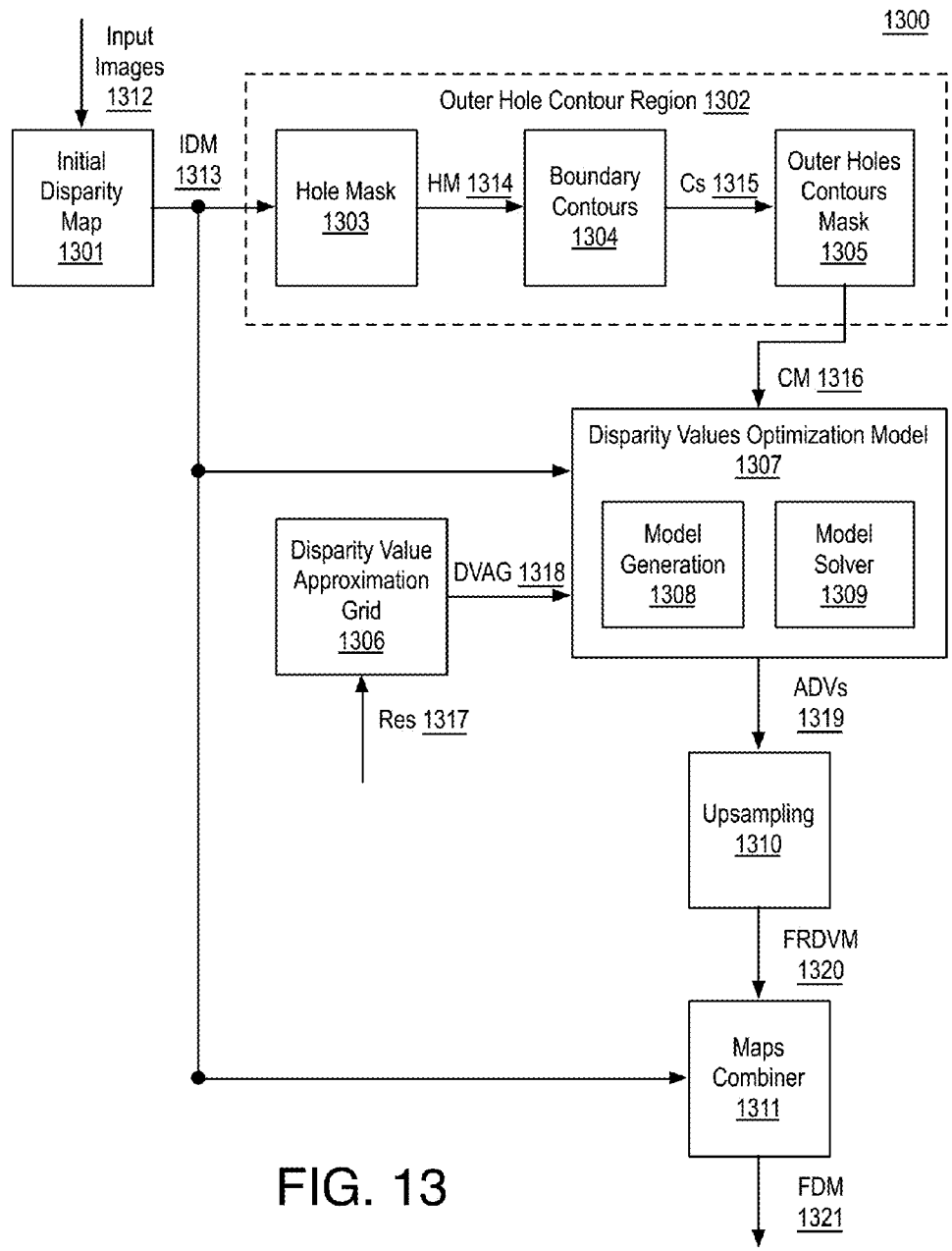
FIG. 13 illustrates an example device for generating a disparity map without hole regions.

FIG. 13 is a block diagram illustrating an example device 1300 for generating a disparity map without hole regions, arranged in accordance with at least some implementations of the present disclosure. As shown in FIG. 13, device 1300 may include an initial disparity map module 1301, an outer hole contour region module 1302, a disparity value approximation grid module 1306, a disparity values optimization model module 1307, an upsampling module 1310, and a maps combiner module 1311. Furthermore, outer hole contour region module 1302 may include a hole mask module 1303, a boundary contours module 1304, and an outer holes contours mask module 1305. Also, disparity values optimization model module 1307 may include a model generation module 1308 and a model solver module 1309. Device 1300 may be any suitable form factor device such as a computer, a laptop computer, a tablet, a smart phone, or the like.

As shown, initial disparity map module 1301 may receive input images 1312. Input images 1312 may include any suitable image data or data structure representing images of a scene. For example, input images 1312 may represent images taken of the same scene from different vantage points as discussed herein. Furthermore, initial disparity map module 1301 may generate initial disparity map (IDM) 1313. Initial disparity map module 1301 may generate initial disparity map 1313 using any suitable technique or techniques such as those discussed with respect to operation 102. Furthermore, as discussed herein, initial disparity map 1313 may include one or more hole regions labeled using a value of zero, another reserved value, an indicator or label, or the like. Initial disparity map module 1301 may provide initial disparity map 1313 to outer hole contour region module 1302, disparity values optimization model module 1307, maps combiner module 1311, and/or to a memory of device 1300 (not shown).

Outer hole contour region module 1302 may receive initial disparity map 1313 from initial disparity map module 1301 or memory and outer hole contour region module 1302 may generate contour map 1316. As discussed, contour map 1311 may include any suitable data representing outer hole contour regions circumscribing hole regions of initial disparity map 1313. For example, contour map 1311 may include a binary bitmask or the like. In some examples, contour map 1311 may be generated by outer hole contour region module 1302 as a discrete map. In other examples, values of contour map 1311 or portions thereof may be generated as needed on-the-fly. Outer hole contour region module 1302 may generate contour map 1311 using any suitable technique or techniques.

For example, hole mask module 1303 of outer hole contour region module 1302 may receive initial disparity map 1313 and hole mask module 1303 may generate a hole mask 1314 such as hole mask, H, as discussed with respect to operation 103. Hole mask module 1303 may provide hole mask 1314 to boundary contours module 1304. Boundary contours module 1304 may receive hole mask 1314 and boundary contours module 1304 may generate contours 1315 (e.g., hole region boundary contours) based on hole mask 1314. In other examples, boundary contours module 1304 may generate contours 1315 based on initial boundary mask 1313 or other image data. Contours 1315 may include any suitable data describing hole region boundary contours such as line segment data, curve segment data, or the like. As shown, boundary contours module 1304 may provide contours 1315 to outer holes contours mask module 1305.

Outer holes contours mask module 1305 may generate contours mask 1316 based on contours 1315 and/or holes mask 1314. For example, outer holes contours mask module 1305 may render contours 1315 onto a bitmap such as a zero bitmap and outer holes contours mask module 1305 may modify any rendered values within hole regions as defined by holes mask 1314. For example, during the discussed rendering some values within hole regions may be rendered (e.g., changed from a value of zero to one or the like). Such values within hole regions may be undesirable as they may cause misprocessing or errors or the like at disparity values optimization model module 1307. Therefore, such modification of any rendered value within hole regions may rectify such rendering results. For example, the modification of any rendered values may include clearing or zeroing out the value based on hole mask 1314 (e.g., if a pixel position is within a hole region as defined by hole mask 1314, the corresponding value may be set to zero in contours mask 1316). Outer hole contour region module 1302 may provide contour mask 1316 to disparity values optimization model module 1307 and/or to memory.

Also as shown, device 1300 may include disparity value approximation grid module 1306, which may optionally receive a resolution indicator (Res) 1317. Resolution indicator 1317 may be preset, received from a user, or generated by another module of device 1300 such as a power management unit or the like. Resolution indicator 1317 may indicate a grid resolution, a grid resolution ratio (e.g., with respect to initial disparity map 1313), or a high level resolution preference (e.g., high, medium, or low, or the like), or the like. Disparity value approximation grid module 1306 may receive resolution indicator 1317 or disparity value approximation grid module 1306 may use a predetermined value or setting or the like, and disparity value approximation grid module 1306 may generate a disparity value approximation grid 1318. For example, disparity value approximation grid 1318 may include any suitable information to provide a grid over initial disparity map 1313 such as grid line locations, grid node locations, or the like. Furthermore, disparity value approximation grid 1318 may have a lower resolution than initial disparity map 1313. As discussed, disparity value approximation grid 1318 may be any suitable grid such as a Cartesian grid, a regular rectangular grid, a rectilinear grid, a polar grid, an unstructured grid or mesh, or the like. As shown, disparity value approximation grid module 1306 may provide disparity value approximation grid 1318 to disparity values optimization model module 1307 and/or a memory of device 1300.

Disparity values optimization model module 1307 may receive initial disparity map 1313, contour mask 1316, and disparity value approximation grid 1318, and disparity values optimization model module 1307 may generate approximated disparity values 1319. For example, approximated disparity values 1319 may include approximated disparity values for grid nodes included in a disparity values optimization model as discussed herein. Disparity values optimization model module 1307 may generate approximated disparity values 1319 using any suitable technique or techniques. As shown, in some examples, model generation module 1308 of disparity values optimization model module 1307 may generate one or more disparity values optimization models and model solver module 1309 of disparity values optimization model module 1307 may solve the generated model(s) to provide approximated disparity values 1319.

For example, model generation module 1308 may select suitable sections of disparity map (e.g., one or more sections for model generation or the entirety of the disparity map for a single model generation) and participant grid nodes (e.g., those within hole regions and/or within a vicinity of an outer hole contour region) as discussed with respect to operation 107 of process 100). Based on the sections (if implemented), participant grid nodes, and contour mask 1316, model generation module 1308 may generate a disparity values optimization model as discussed herein. For example, the disparity values optimization model may include a disparity difference term and a smoothness term generated with disparity values at participant grid nodes as unknowns and known contour values from initial disparity map 1313 and within contour regions as defined by contour mask 1316. For example, the disparity values optimization model may be defined as discussed with respect to Equations (1)-(3).

Model solver module 1309 of disparity values optimization model module 1307 may solve or optimize the disparity values optimization model to generate approximated disparity values 1319. For example, the disparity values optimization model may be optimized (e.g., minimized or the like) to determine approximated disparity values 1319. Model solver module 1309 may optimize the disparity values optimization model using any suitable technique or techniques. For example, model solver module 1309 may be a linear sparse solver to a linear system derived from the disparity values optimization model as discussed herein. Disparity values optimization model module 1307 may provide approximated disparity values 1319 to upsampling module 1310 and/or a memory of device 1300.

Upsampling module 1310 may receive approximated disparity values 1319 from disparity values optimization model module 1307 or memory and upsampling module 1310 may generate a full resolution interpolated values map 1320. Full resolution interpolated values map 1320 may include full resolution interpolated values for at least portions (e.g., hole regions and some portion surrounding hole regions) of initial disparity map 1313. Upsampling module 1310 may generate full resolution interpolated values map 1320 using any suitable technique or techniques. For example, upsampling module 1310 may generate full resolution interpolated values map 1320 via a bilinear interpolation based on approximated disparity values 1319. Upsampling module 1310 may provide full resolution interpolated values map 1320 to maps combiner module 1311 and/or a memory of device 1300.

Maps combiner module 1311 may receive initial disparity map 1313 and full resolution interpolated values map 1320 and maps combiner module 1311 may generate a final disparity map 1321. Maps combiner module 1311 may generate final disparity map 1321 using any suitable technique or techniques. For example, maps combiner module 1311 may replace hole region values of initial disparity map 1313 (e.g., values indicative of holes in initial disparity map 1313) with the corresponding values (e.g., by pixel location) of full resolution interpolated values map 1320. In some examples, maps combiner module 1311 may receive hole mask 1314 from outer hole contour region module 1302 and maps combiner module 1311 may generate final disparity map 1321 based on hole mask 1314 such that locations indicated as holes via hole mask 1314 are provided values from full resolution interpolated values map 1320 and locations indicates non-holes via hole mask 1314 are provided values from initial disparity map 1313.

Maps combiner module 1311 may provide final disparity map 1321 to a memory of device 1300 or another module of 1300 for further processing or for processing based on final disparity map. For example, final disparity map 1321 may be provided as a portion of an image processing pipeline such that other portions of the pipeline or other components of device 1300 may process images based on final disparity map 1321. For example, final disparity map 1321 may be used to provide segmentation effects, for computational photography applications, to create parallax views, for refocusing, for imaging effects, or the like.

Figure 14:
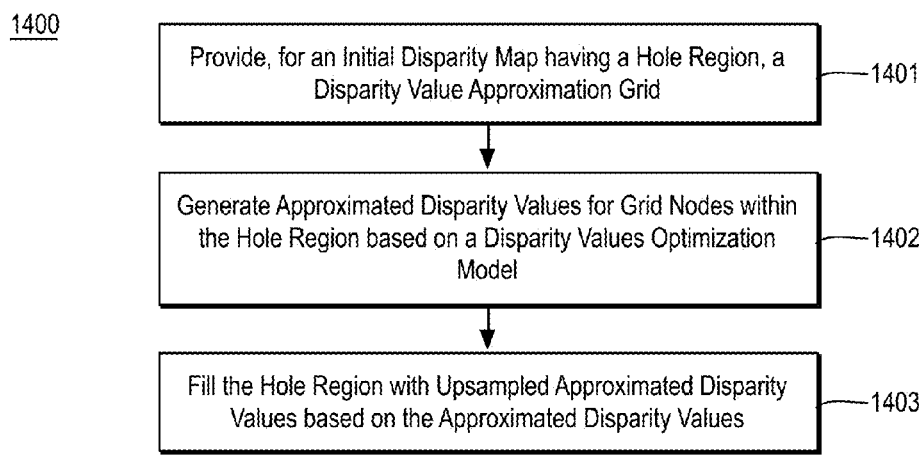
FIG. 14 is a flow diagram illustrating an example process for filling holes in a disparity map.

FIG. 14 is a flow diagram illustrating an example process 1400 for filling holes in a disparity map, arranged in accordance with at least some implementations of the present disclosure. Process 1400 may include one or more operations 1401-1403 as illustrated in FIG. 14. Process 1400 may form at least part of disparity map hole filling process. By way of non-limiting example, process 1400 may form at least part of a disparity map hole filling process performed by device 1300 as discussed herein. Furthermore, process 1400 will be described herein with reference to system 1500 of FIG. 15.

Figure 15:
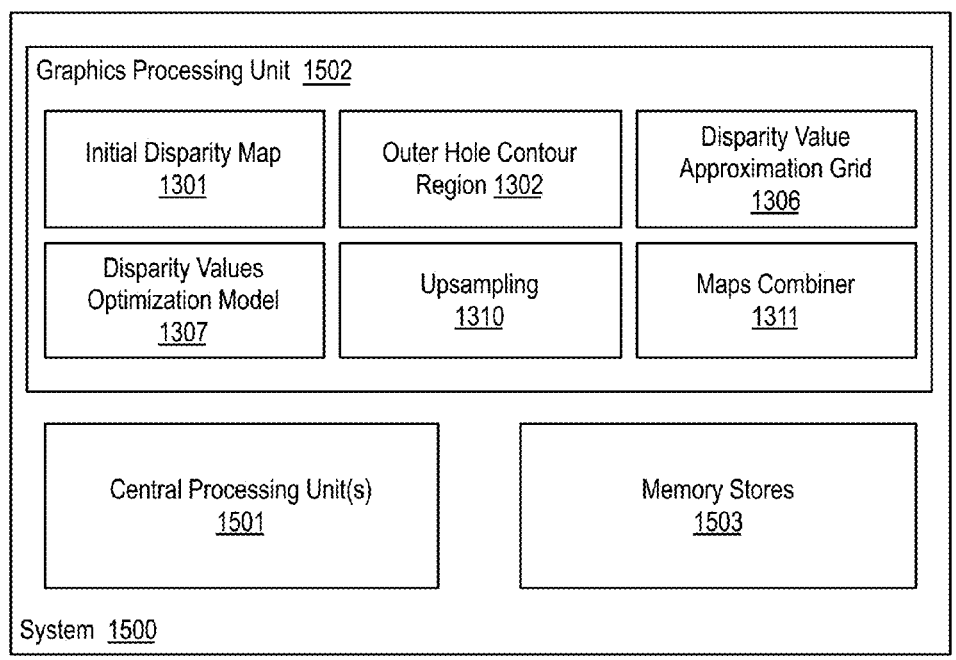
FIG. 15 is an illustrative diagram of an example system for filling holes in a disparity map.

FIG. 15 is an illustrative diagram of an example system 1500 for filling holes in a disparity map, arranged in accordance with at least some implementations of the present disclosure. As shown in FIG. 15, system 1500 may include one or more central processing units (CPU) 1501, a graphics processing unit 1502, and memory stores 1503. Also as shown, graphics processing unit 1502 may include initial disparity map module 1301, outer hole contour region module 1302, disparity value approximation grid module 1306, disparity values optimization model module 1307, upsampling module 1310, and maps combiner module 1311. Such modules may be implemented to perform operations as discussed herein. In the example of system 1500, memory stores 1503 may store input images, initial disparity maps, hole masks, contour data, contour maps, disparity value approximation grid data, disparity value approximation grid resolution data, disparity values optimization model parameters, approximated disparity values, upsampling parameters, final resolution disparity values maps, final disparity value maps, pixel data, sectioning data, or the like.

As shown, in some examples, initial disparity map module 1301, outer hole contour region module 1302, disparity value approximation grid module 1306, disparity values optimization model module 1307, upsampling module 1310, and maps combiner module 1311 may be implemented via graphics processing unit 1502. In other examples, one or more or portions of initial disparity map module 1301, outer hole contour region module 1302, disparity value approximation grid module 1306, disparity values optimization model module 1307, upsampling module 1310, and maps combiner module 1311 may be implemented via central processing units 1501 or an image processing unit (not shown) of system 1500. In yet other examples, one or more or portions of initial disparity map module 1301, outer hole contour region module 1302, disparity value approximation grid module 1306, disparity values optimization model module 1307, upsampling module 1310, and maps combiner module 1311 may be implemented via an imaging processing pipeline, graphics pipeline, or the like.

Graphics processing unit 1502 may include any number and type of graphics processing units, that may provide the operations as discussed herein. Such operations may be implemented via software or hardware or a combination thereof. For example, graphics processing unit 1502 may include circuitry dedicated to manipulate image data or disparity values data or the like obtained from memory stores 1503 (e.g., input images, initial disparity value maps, or the like). Central processing units 1501 may include any number and type of processing units or modules that may provide control and other high level functions for system 1500 and/or provide any operations as discussed herein. Memory stores 1503 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1503 may be implemented by cache memory. In an embodiment, one or more or portions of initial disparity map module 1301, outer hole contour region module 1302, disparity value approximation grid module 1306, disparity values optimization model module 1307, upsampling module 1310, and maps combiner module 1311 may be implemented via an execution unit (EU) of graphics processing unit 1502. The EU may include, for example, programmable logic or circuitry such as a logic core or cores that may provide a wide array of programmable logic functions. In an embodiment, one or more or portions of initial disparity map module 1301, outer hole contour region module 1302, disparity value approximation grid module 1306, disparity values optimization model module 1307, upsampling module 1310, and maps combiner module 1311 may be implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of initial disparity map module 1301, outer hole contour region module 1302, disparity value approximation grid module 1306, disparity values optimization model module 1307, upsampling module 1310, and maps combiner module 1311 may be implemented via an application specific integrated circuit (ASIC). The ASIC may include an integrated circuitry customized to perform the operations discussed herein.

Returning to discussion of FIG. 14, process 1400 may begin at operation 1401, "Provide, for an Initial Disparity Map having a Hole Region, a Disparity Value Approximation Grid", where, for an initial disparity map having at least one hole region, a disparity value approximation grid may be provided such that the disparity value approximation grid has a lower resolution than the initial disparity map. For example, disparity value approximation grid module 1306 as implemented via graphics processing unit 1502 may provide a disparity value approximation grid for an initial disparity map having at least one hole region. For example, the initial disparity map may have a pixel resolution (e.g., the initial disparity map may be a pixel resolution initial disparity map) and the disparity value approximation grid may have grid nodes separated by not less than two pixels.

Processing may continue at operation 1402, "Generate Approximated Disparity Values for Grid Nodes within the Hole Region based on a Disparity Values Optimization Model", where approximated disparity values may be generated for at least grid nodes of the disparity value approximation grid within the hole region of the initial disparity map based on a disparity values optimization model. For example, disparity values optimization model module 1307 as implemented via graphics processing unit 1502 may generate the approximated disparity values for at least grid nodes of the disparity value approximation grid within the hole region of the initial disparity map based on a disparity values optimization model.

As discussed, in some examples, an outer hole contour region circumscribing the hole region may be generated and the disparity values optimization model may be implemented only based on grid nodes of the disparity value approximation grid within a vicinity of the outer hole contour region. For example, outer hole contour region module 1302 may determine the outer hole contour region. In some examples, the outer hole contour region may be generated by detecting a hole region boundary of the hole region, rendering the hole region boundary onto a bitmap, and modifying at least one rendered value within the hole region. For example, the hole region boundary may be detected by a boundary contours module of outer hole contour region module 1302 based on a hole mask or the initial disparity map, the hole region may be rendered by a boundary contours module of outer hole contour region module 1302, and modifying the rendered value may include clearing or zeroing out any values within the hole region based on a hole mask generated by a hole mask module of outer hole contour region module 1302. Furthermore, the discussed vicinity of the outer hole contour region may be any suitable vicinity such as a distance from any portion of the outer hole contour region, grid nodes of the disparity value approximation grid adjacent to any portion of the outer hole contour region, grid cells intersected by any portion of the outer hole contour region, or the like.

The discussed disparity values optimization model may include any suitable model such as a non-linear disparity values cost model having a disparity difference of the approximated values and a smoothness of the approximated disparity values. For example, the disparity values optimization model may include a disparity difference term and a smoothness term. In some examples, the disparity values optimization model may also include a saliency term or the like. Furthermore, generating the approximated disparity values may include any suitable technique or techniques such as applying a sparse solver to a linear conversion of the non-linear disparity values cost model (e.g., applying a sparse solver to a linear system derived from the non-linear disparity values cost optimization problem).

Processing may continue at operation 1403, "Fill the Hole Region with Upsampled Approximated Disparity Values based on the Approximated Disparity Values", where the hole region may be filled with upsampled approximated disparity values based on the approximated disparity values to generate a final disparity map. For example, upsampling module 1310 as implemented via graphics processing unit 1502 may upsample the approximated disparity values and maps combiner module 1311 as implemented via graphics processing unit 1502 may combine a final resolution approximated disparity values map with the initial disparity map. However, the final disparity map may be generated based on any suitable technique or technique that provides final resolution approximated disparity values within the initial disparity map.

In some examples, the initial disparity map may include a second hole regions. In such examples, second approximated disparity values may be generated for second grid nodes of the disparity value approximation grid within the second hole region of the initial disparity map based on a second disparity values optimization model such that the disparity values optimization model and the second disparity values optimization model comprise separate optimizations. In some examples, the approximated disparity values and the second approximated disparity values may be generated in parallel for example. For example, the initial disparity map may be sectioned based on a predetermined pattern or based on the hole regions and separate disparity values optimization model may be made for each sections or combinations of such sections.

In other examples, the second approximated disparity values for second grid nodes of the disparity value approximation grid within the second hole region of the initial disparity map may be generated based on the disparity values optimization model such that the disparity values optimization model includes an optimization based on the grid nodes within the hole region and the second grid nodes within the second hole region. For example, the entirety of the initial disparity map may be provided to a single disparity values optimization model.

Process 1400 may provide for filling holes or hole regions in a disparity map. Process 1400 may be repeated any number of times either in series or in parallel for any number of disparity maps or sections of a disparity map. In some examples, sections of a disparity map may be processed in parallel as discussed herein.

Various components of the systems described herein may be implemented in software, firmware, and/or hardware and/or any combination thereof. For example, various components of device 1300, system 1500, system 1600, or device 1700 may be provided, at least in part, by hardware of a computing System-on-a-Chip (SoC) such as may be found in a computing system such as, for example, a computer, a laptop computer, a tablet, or a smart phone. For example, such components or modules may be implemented via a multi-core SoC processor. Those skilled in the art may recognize that systems described herein may include additional components that have not been depicted in the corresponding figures.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of device 1300, system 1500, system 1600, or device 1700, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 16:
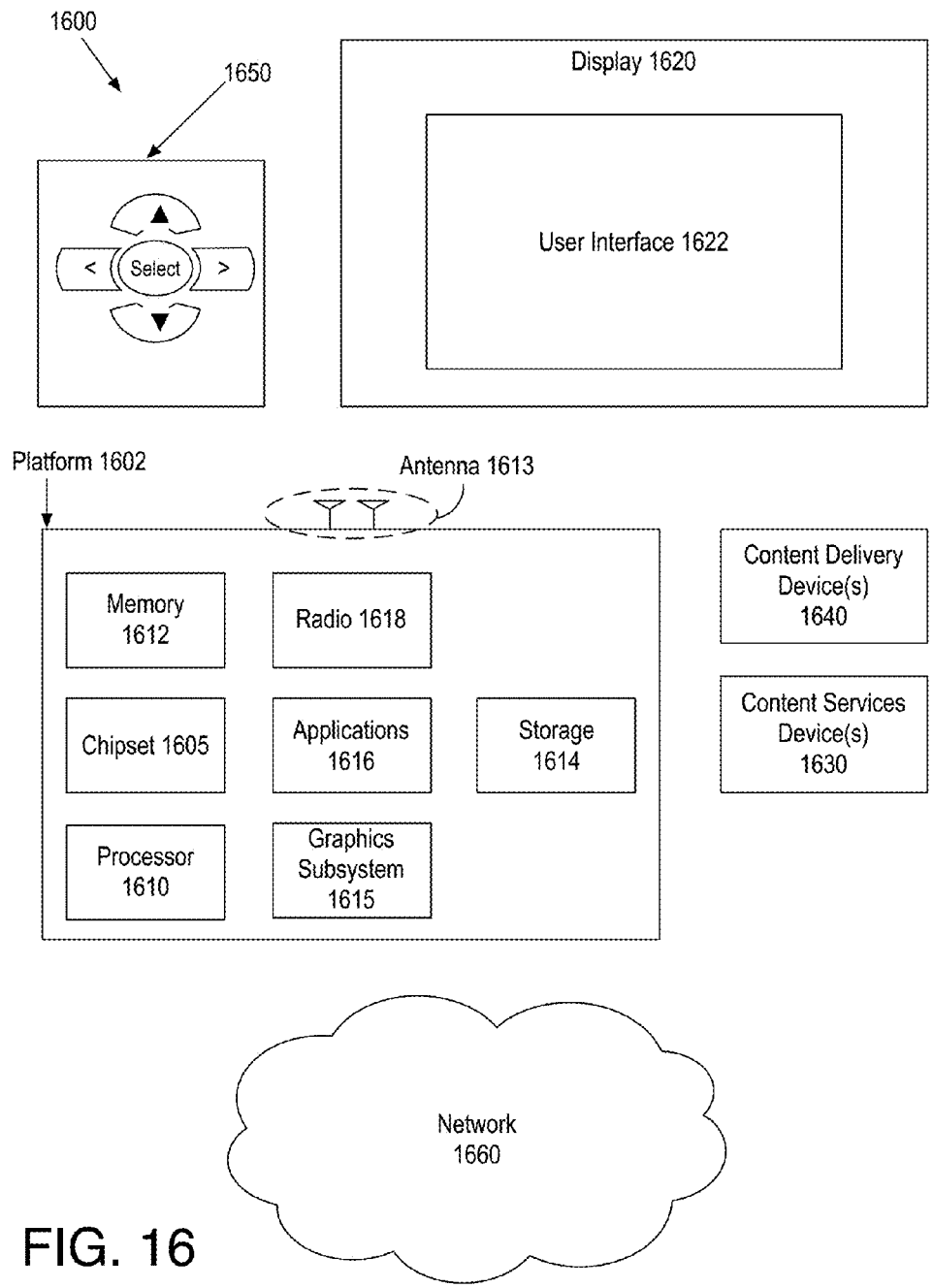
FIG. 16 is an illustrative diagram of an example system.

FIG. 16 is an illustrative diagram of an example system 1600, arranged in accordance with at least some implementations of the present disclosure. In various implementations, system 1600 may be a computing system although system 1600 is not limited to this context. For example, system 1600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, peripheral device, scanner, printer, multi-function device, and so forth.

In various implementations, system 1600 includes a platform 1602 coupled to a display 1620. Platform 1602 may receive content from a content device such as content services device(s) 1630 or content delivery device(s) 1640 or other similar content sources such as a printer/scanner. A navigation controller 1650 including one or more navigation features may be used to interact with, for example, platform 1602 and/or display 1620. Each of these components is described in greater detail below.

In various implementations, platform 1602 may include any combination of a chipset 1605, processor 1610, memory 1612, antenna 1613, storage 1614, graphics subsystem 1615, applications 1616 and/or radio 1618. Chipset 16045 may provide intercommunication among processor 1610, memory 1612, storage 1614, graphics subsystem 1615, applications 1616 and/or radio 1618. For example, chipset 1605 may include a storage adapter (not depicted) capable of providing intercommunication with storage 1614.

Processor 1610 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1610 may be dual-core processor(s), dual-core mobile processor(s), and so forth.

Memory 1612 may be implemented as a volatile memory device such as, but not limited to, a Random Access Memory (RAM), Dynamic Random Access Memory (DRAM), or Static RAM (SRAM).

Storage 1614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1614 may include technology to increase the storage performance enhanced protection for valuable digital media when multiple hard drives are included, for example.

Graphics subsystem 1615 may perform processing of images such as still images, graphics, or video for display. Graphics subsystem 1615 may be a graphics processing unit (GPU), a visual processing unit (VPU), or an image processing unit, for example. In some examples, graphics subsystem 1615 may perform scanned image rendering as discussed herein. An analog or digital interface may be used to communicatively couple graphics subsystem 1615 and display 1620. For example, the interface may be any of a High-Definition Multimedia Interface, DisplayPort, wireless HDMI, and/or wireless HD compliant techniques. Graphics subsystem 1615 may be integrated into processor 1610 or chipset 1605. In some implementations, graphics subsystem 1615 may be a stand-alone device communicatively coupled to chipset 1605.

The image processing techniques described herein may be implemented in various hardware architectures. For example, image processing functionality may be integrated within a chipset. Alternatively, a discrete graphics and/or image processor and/or application specific integrated circuit may be used. As still another implementation, the image processing may be provided by a general purpose processor, including a multi-core processor. In further embodiments, the functions may be implemented in a consumer electronics device.

Radio 1618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1618 may operate in accordance with one or more applicable standards in any version.

In various implementations, display 1620 may include any flat panel monitor or display. Display 1620 may include, for example, a computer display screen, touch screen display, video monitor, television-like device, and/or a television. Display 1620 may be digital and/or analog. In various implementations, display 1620 may be a holographic display. Also, display 1620 may be a transparent surface that may receive a visual projection. Such projections may convey various forms of information, images, and/or objects. For example, such projections may be a visual overlay for a mobile augmented reality (MAR) application. Under the control of one or more software applications 1616, platform 1602 may display user interface 1622 on display 1620.

In various implementations, content services device(s) 1630 may be hosted by any national, international and/or independent service and thus accessible to platform 1602 via the Internet, for example. Content services device(s) 1630 may be coupled to platform 1602 and/or to display 1620. Platform 1602 and/or content services device(s) 1630 may be coupled to a network 1660 to communicate (e.g., send and/or receive) media information to and from network 1660. Content delivery device(s) 1640 also may be coupled to platform 1602 and/or to display 1620.

In various implementations, content services device(s) 1630 may include a cable television box, personal computer, network, telephone, Internet enabled devices or appliance capable of delivering digital information and/or content, and any other similar device capable of uni-directionally or bi-directionally communicating content between content providers and platform 1602 and/display 1620, via network 1660 or directly. It will be appreciated that the content may be communicated uni-directionally and/or bi-directionally to and from any one of the components in system 1600 and a content provider via network 1660. Examples of content may include any media information including, for example, video, music, medical and gaming information, and so forth.

Content services device(s) 1630 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1602 may receive control signals from navigation controller 1650 having one or more navigation features. The navigation features of navigation controller 1650 may be used to interact with user interface 1622, for example. In various embodiments, navigation controller 1650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1650 may be replicated on a display (e.g., display 1620) by movements of a pointer, cursor, focus ring, or other visual indicators displayed on the display. For example, under the control of software applications 1616, the navigation features located on navigation controller 1650 may be mapped to virtual navigation features displayed on user interface 1622, for example. In various embodiments, navigation controller 1650 may not be a separate component but may be integrated into platform 1602 and/or display 1620. The present disclosure, however, is not limited to the elements or in the context shown or described herein.

In various implementations, drivers (not shown) may include technology to enable users to instantly turn on and off platform 1602 like a television with the touch of a button after initial boot-up, when enabled, for example. Program logic may allow platform 1602 to stream content to media adaptors or other content services device(s) 1630 or content delivery device(s) 1640 even when the platform is turned "off." In addition, chipset 1605 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1600 may be integrated. For example, platform 1602 and content services device(s) 1630 may be integrated, or platform 1602 and content delivery device(s) 1640 may be integrated, or platform 1602, content services device(s) 1630, and content delivery device(s) 1640 may be integrated, for example. In various embodiments, platform 1602 and display 1620 may be an integrated unit. Display 1620 and content service device(s) 1630 may be integrated, or display 1620 and content delivery device(s) 1640 may be integrated, for example. These examples are not meant to limit the present disclosure.

In various embodiments, system 1600 may be implemented as a wireless system, a wired system, or a combination of both. When implemented as a wireless system, system 1600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1600 may include components and interfaces suitable for communicating over wired communications media, such as input/ output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 16.

Figure 17:
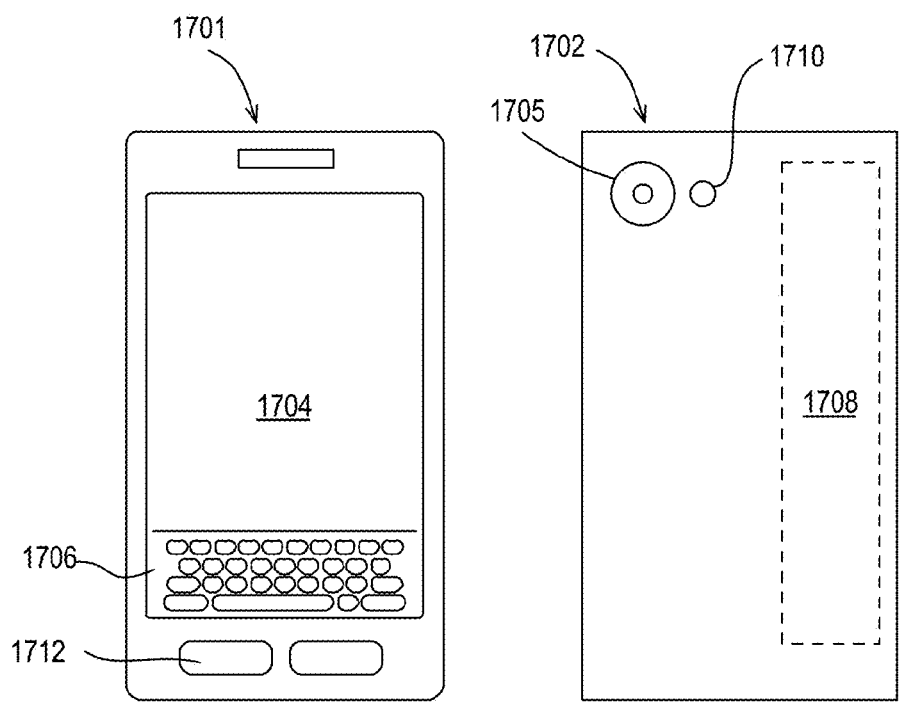
FIG. 17 illustrates an example small form factor device, all arranged in accordance with at least some implementations of the present disclosure.

As described above, system 1600 may be embodied in varying physical styles or form factors. FIG. 17 illustrates an example small form factor device 1700, arranged in accordance with at least some implementations of the present disclosure. In some examples, system 1600 may be implemented via device 1700. In other examples, device 1300, system 1500, system 1600, or device 1700, or portions thereof may be implemented via device 1700. In various embodiments, for example, device 1700 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 17, device 1700 may include a housing with a front 1701 and a back 1702. Device 1700 includes a display 1704, an input/output (I/O) device 1706, and an integrated antenna 1708. Device 1700 also may include navigation features 1712. I/O device 1706 may include any suitable I/O device for entering information into a mobile computing device. Examples for I/O device 1706 may include an alphanumeric keyboard, a numeric keypad, a touch pad, input keys, buttons, switches, microphones, speakers, voice recognition device and software, and so forth. Information also may be entered into device 1700 by way of microphone (not shown), or may be digitized by a voice recognition device. As shown, device 1700 may include a camera 1705 (e.g., including a lens, an aperture, and an imaging sensor) and a flash 1710 integrated into back 1702 (or elsewhere) of device 1700. In other examples, camera 1705 and flash 1710 may be integrated into front 1701 of device 1700 or both front and back cameras may be provided. Camera 1705 and flash 1710 may be components of a camera module to originate image data processed into streaming video that is output to display 1704 and/or communicated remotely from device 1700 via antenna 1708 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a method for filling holes in a disparity map comprises providing, for an initial disparity map having at least one hole region, a disparity value approximation grid, wherein the disparity value approximation grid comprise a lower resolution than the initial disparity map, generating approximated disparity values for at least grid nodes of the disparity value approximation grid within the hole region of the initial disparity map based on a disparity values optimization model, and filling the hole region with upsampled approximated disparity values based on the approximated disparity values to generate a final disparity map.

Further to the first embodiments, the method further comprises generating an outer hole contour region circumscribing the hole region, wherein the disparity values optimization model is implemented only based on grid nodes of the disparity value approximation grid within a vicinity of the outer hole contour region.

Further to the first embodiments, the method further comprises generating an outer hole contour region circumscribing the hole region, wherein the disparity values optimization model is implemented only based on grid nodes of the disparity value approximation grid within a vicinity of the outer hole contour region, wherein generating the outer hole contour region comprises detecting a hole region boundary of the hole region, rendering the hole region boundary onto a bitmap, and modifying at least one rendered value within the hole region.

Further to the first embodiments, the method further comprises generating an outer hole contour region circumscribing the hole region, wherein the disparity values optimization model is implemented only based on grid nodes of the disparity value approximation grid within a vicinity of the outer hole contour region, wherein generating the outer hole contour region comprises detecting a hole region boundary of the hole region, rendering the hole region boundary onto a bitmap, and modifying at least one rendered value within the hole region, and the method further comprises generating a hole mask based on the initial disparity map, wherein the hole region boundary is detected based on the hole mask and the at least one value is modified to clear the at least one value based on the hole mask.

Further to the first embodiments, the method further comprises generating an outer hole contour region circumscribing the hole region, wherein the disparity values optimization model is implemented only based on grid nodes of the disparity value approximation grid within a vicinity of the outer hole contour region, wherein the vicinity comprises grid nodes of the disparity value approximation grid adjacent to any portion of the outer hole contour region.

Further to the first embodiments, the disparity values optimization model comprises a non-linear disparity values cost model comprising a disparity difference of the approximated values and a smoothness of the approximated disparity values.

Further to the first embodiments, the disparity values optimization model comprises a non-linear disparity values cost model comprising a disparity difference of the approximated values and a smoothness of the approximated disparity values, wherein generating the approximated disparity values comprises applying a sparse solver to a linear system derived from the non-linear disparity values cost optimization problem.

Further to the first embodiments, the initial disparity map comprises a second hole region and the method further comprises generating second approximated disparity values for at least second grid nodes of the disparity value approximation grid within the second hole region of the initial disparity map based on a second disparity values optimization model, wherein the disparity values optimization model and the second disparity values optimization model comprise separate optimizations.

Further to the first embodiments, the initial disparity map comprises a second hole region and the method further comprises generating second approximated disparity values for at least second grid nodes of the disparity value approximation grid within the second hole region of the initial disparity map based on a second disparity values optimization model, wherein the disparity values optimization model and the second disparity values optimization model comprise separate optimizations, wherein the approximated disparity values and the second approximated disparity values are generated in parallel.

Further to the first embodiments, the initial disparity map comprises a second hole region and the method further comprises generating second approximated disparity values for at least second grid nodes of the disparity value approximation grid within the second hole region of the initial disparity map based on a second disparity values optimization model, wherein the disparity values optimization model and the second disparity values optimization model comprise separate optimizations, wherein the approximated disparity values and the second approximated disparity values are generated in parallel.

Further to the first embodiments, the initial disparity map comprises a second hole region and the method further comprises generating second approximated disparity values for at least second grid nodes of the disparity value approximation grid within the second hole region of the initial disparity map based on the disparity values optimization model, wherein the disparity values optimization model comprises an optimization based on the grid nodes within the hole region and the second grid nodes within the second hole region.

Further to the first embodiments, the initial disparity map comprises a pixel resolution disparity map and the disparity value approximation grid comprises grid nodes separated by not less than two pixels.

In one or more second embodiments, a system for filling holes in a disparity map comprises a memory configured to receive an initial disparity map having at least one hole region and a graphics processing unit coupled to the memory, the graphics processing unit to provide a disparity value approximation grid for the initial disparity map, wherein the disparity value approximation grid comprise a lower resolution than the initial disparity map, to generate approximated disparity values for at least grid nodes of the disparity value approximation grid within the hole region of the initial disparity map based on a disparity values optimization model, and to fill the hole region with upsampled approximated disparity values based on the approximated disparity values to generate a final disparity map.

Further to the second embodiments, the system further comprises outer hole contour region logic to generate an outer hole contour region circumscribing the hole region, wherein the disparity values optimization model is implemented only based on grid nodes of the disparity value approximation grid within a vicinity of the outer hole contour region.

Further to the second embodiments, the system further comprises outer hole contour region logic to generate an outer hole contour region circumscribing the hole region, wherein the disparity values optimization model is implemented only based on grid nodes of the disparity value approximation grid within a vicinity of the outer hole contour region, wherein the outer hole contour region logic comprises boundary contours logic to detect a hole region boundary of the hole region and outer holes contours mask logic to render the hole region boundary onto a bitmap and modify at least one rendered value within the hole region.

Further to the second embodiments, the system further comprises outer hole contour region logic to generate an outer hole contour region circumscribing the hole region, wherein the disparity values optimization model is implemented only based on grid nodes of the disparity value approximation grid within a vicinity of the outer hole contour region, wherein the vicinity comprises grid nodes of the disparity value approximation grid adjacent to any portion of the outer hole contour region.

Further to the second embodiments, the disparity values optimization model comprises a non-linear disparity values cost model comprising a disparity difference of the approximated values and a smoothness of the approximated disparity values.

Further to the second embodiments, the disparity values optimization model comprises a non-linear disparity values cost model comprising a disparity difference of the approximated values and a smoothness of the approximated disparity values, wherein the graphics processing unit to generate the approximated disparity values comprises the graphics processing unit to apply a sparse solver to a linear system derived from the non-linear disparity values cost optimization problem.

Further to the second embodiments, the initial disparity map comprises a second hole region and the graphics processing unit is to generate second approximated disparity values for at least second grid nodes of the disparity value approximation grid within the second hole region of the initial disparity map based on a second disparity values optimization model, wherein the disparity values optimization model and the second disparity values optimization model comprise separate optimizations, and wherein the graphics processing unit is to generate the approximated disparity values and the second approximated disparity values in parallel.

Further to the second embodiments, the initial disparity map comprises a second hole region and wherein graphics processing unit is to generate second approximated disparity values for at least second grid nodes of the disparity value approximation grid within the second hole region of the initial disparity map based on the disparity values optimization model, wherein the disparity values optimization model comprises an optimization based on the grid nodes within the hole region and the second grid nodes within the second hole region.

Further to the second embodiments, the initial disparity map comprises a pixel resolution disparity map and the disparity value approximation grid comprises grid nodes separated by not less than two pixels.

In one or more third embodiments, a system for filling holes in a disparity map comprises means for providing, for an initial disparity map having at least one hole region, a disparity value approximation grid, wherein the disparity value approximation grid comprise a lower resolution than the initial disparity map, means for generating approximated disparity values for at least grid nodes of the disparity value approximation grid within the hole region of the initial disparity map based on a disparity values optimization model, and means for filling the hole region with upsampled approximated disparity values based on the approximated disparity values to generate a final disparity map.

Further to the third embodiments, the system further comprises means for generating an outer hole contour region circumscribing the hole region, wherein the disparity values optimization model is implemented only based on grid nodes of the disparity value approximation grid within a vicinity of the outer hole contour region.

Further to the third embodiments, the system further comprises means for generating an outer hole contour region circumscribing the hole region, wherein the disparity values optimization model is implemented only based on grid nodes of the disparity value approximation grid within a vicinity of the outer hole contour region, wherein the means for generating the outer hole contour region comprise means for detecting a hole region boundary of the hole region, means for rendering the hole region boundary onto a bitmap, and means for modifying at least one rendered value within the hole region.

Further to the third embodiments, the system further comprises means for generating an outer hole contour region circumscribing the hole region, wherein the disparity values optimization model is implemented only based on grid nodes of the disparity value approximation grid within a vicinity of the outer hole contour region, wherein the means for generating the outer hole contour region comprise means for detecting a hole region boundary of the hole region, means for rendering the hole region boundary onto a bitmap, and means for modifying at least one rendered value within the hole region, and the system further comprises means for generating a hole mask based on the initial disparity map, wherein the hole region boundary is detected based on the hole mask and the at least one value is modified to clear the at least one value based on the hole mask.

Further to the third embodiments, the system further comprises means for generating an outer hole contour region circumscribing the hole region, wherein the disparity values optimization model is implemented only based on grid nodes of the disparity value approximation grid within a vicinity of the outer hole contour region, wherein the vicinity comprises grid nodes of the disparity value approximation grid adjacent to any portion of the outer hole contour region.

Further to the third embodiments, the disparity values optimization model comprises a non-linear disparity values cost model comprising a disparity difference of the approximated values and a smoothness of the approximated disparity values.

Further to the third embodiments, the means for generating the approximated disparity values comprises means for applying a sparse solver to a linear system derived from the non-linear disparity values cost optimization problem.

Further to the third embodiments, the initial disparity map comprises a second hole region and the system further comprises means for generating second approximated disparity values for at least second grid nodes of the disparity value approximation grid within the second hole region of the initial disparity map based on a second disparity values optimization model, wherein the disparity values optimization model and the second disparity values optimization model comprise separate optimizations.

Further to the third embodiments, the initial disparity map comprises a second hole region and the system further comprises means for generating second approximated disparity values for at least second grid nodes of the disparity value approximation grid within the second hole region of the initial disparity map based on a second disparity values optimization model, wherein the disparity values optimization model and the second disparity values optimization model comprise separate optimizations, wherein the means for generating the approximated disparity values and the mans for generating the second approximated disparity values are to generate the approximated disparity values and the second approximated disparity values in parallel.

Further to the third embodiments, the initial disparity map comprises a second hole region and the system further comprises means for generating second approximated disparity values for at least second grid nodes of the disparity value approximation grid within the second hole region of the initial disparity map based on the disparity values optimization model, wherein the disparity values optimization model comprises an optimization based on the grid nodes within the hole region and the second grid nodes within the second hole region.

Further to the third embodiments, the initial disparity map comprises a pixel resolution disparity map and the disparity value approximation grid comprises grid nodes separated by not less than two pixels.

In one or more fourth embodiments, at least one machine readable medium comprises a plurality of instructions that, in response to being executed on a device, cause the device to fill holes in a disparity map by providing, for an initial disparity map having at least one hole region, a disparity value approximation grid, wherein the disparity value approximation grid comprise a lower resolution than the initial disparity map, generating approximated disparity values for at least grid nodes of the disparity value approximation grid within the hole region of the initial disparity map based on a disparity values optimization model, and filling the hole region with upsampled approximated disparity values based on the approximated disparity values to generate a final disparity map.

Further to the fourth embodiments, the machine readable medium comprises further instructions that, in response to being executed on the device, cause the device to fill holes in the disparity map by generating an outer hole contour region circumscribing the hole region, wherein the disparity values optimization model is implemented only based on grid nodes of the disparity value approximation grid within a vicinity of the outer hole contour region.

Further to the fourth embodiments, the machine readable medium comprises further instructions that, in response to being executed on the device, cause the device to fill holes in the disparity map by generating an outer hole contour region circumscribing the hole region, wherein the disparity values optimization model is implemented only based on grid nodes of the disparity value approximation grid within a vicinity of the outer hole contour region, wherein generating the outer hole contour region comprises generating a hole mask based on the initial disparity map, detecting a hole region boundary of the hole region based on the hole mask, rendering the hole region boundary onto a bitmap, and modifying at least one rendered value within the hole region based on the hole mask.

Further to the fourth embodiments, the machine readable medium comprises further instructions that, in response to being executed on the device, cause the device to fill holes in the disparity map by generating an outer hole contour region circumscribing the hole region, wherein the disparity values optimization model is implemented only based on grid nodes of the disparity value approximation grid within a vicinity of the outer hole contour region, wherein the vicinity comprises grid nodes of the disparity value approximation grid adjacent to any portion of the outer hole contour region.

Further to the fourth embodiments, the disparity values optimization model comprises a non-linear disparity values cost model comprising a disparity difference of the approximated values and a smoothness of the approximated disparity values and generating the approximated disparity values comprises applying a sparse solver to a linear system derived from the non-linear disparity values cost optimization problem.

Further to the fourth embodiments, the initial disparity map comprises a second hole region and the machine readable medium comprises further instructions that, in response to being executed on the device, cause the device to fill holes in the disparity map by generating second approximated disparity values for at least second grid nodes of the disparity value approximation grid within the second hole region of the initial disparity map based on a second disparity values optimization model, wherein the disparity values optimization model and the second disparity values optimization model comprise separate optimizations, and wherein the approximated disparity values and the second approximated disparity values are generated in parallel.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer implemented method for filling holes in a disparity map comprising:
   providing, for an initial disparity map having a hole region and a contour region circumscribing the hole region, a disparity value approximation grid having a lower resolution than the initial disparity map and comprising a plurality of grid nodes and a plurality of grid cells between respective grid nodes;
   determining, from the disparity value approximation grid, selected grid nodes comprising only those grid nodes within the hole region or having a portion of the contour region adjacent thereto, the selected grid nodes comprising multiple first grid nodes defining a first grid cell therebetween, the first grid cell having a portion of the contour region therein;
   generating a disparity values optimization model comprising an approximated disparity value for each of the selected grid nodes, wherein the disparity values optimization model comprises a sum of a disparity difference term and a smoothness term, wherein the disparity difference term comprises differences between disparity values from the initial disparity map and weighted averages of approximated disparity values of the first grid nodes for only those coordinate positions in the first grid cell included in the contour region while disparity values from the initial disparity map are excluded from the disparity difference term for coordinate positions in the first grid cell not included in the contour region, and wherein the smoothness term comprises differences between approximated disparity values of the selected grid nodes;

generating a resultant approximated disparity values for each of the approximated disparity values by optimizing the disparity values optimization model; and filling the hole region with upsampled approximated disparity values based on the resultant approximated disparity values to generate a final disparity map.

2. The method of claim 1, further comprising:
generating the contour region circumscribing the hole region by:
detecting a hole region boundary of the hole region;
rendering the hole region boundary onto a bitmap; and
modifying at least one rendered value within the hole region.

3. The method of claim 2, further comprising:
generating a hole mask based on the initial disparity map, wherein the hole region boundary is detected based on the hole mask and the at least one value is modified to clear the at least one value based on the hole mask.

4. The method of claim 1, wherein the smoothness term comprises a sum of squared differences between the approximated disparity values.

5. The method of claim 1, wherein the disparity difference term comprises a sum of squares of each difference between the disparity value from the initial disparity map and the weighted average of approximated disparity values of the first grid nodes.

6. The method of claim 1, wherein optimizing the disparity values optimization model comprises applying a sparse solver to a linear system derived from the disparity values optimization model.

7. The method of claim 1, wherein the initial disparity map comprises a second hole region, the method further comprising:
generating second resultant approximated disparity values for at least second selected grid nodes of the disparity value approximation grid within the second hole region of the initial disparity map based on a second disparity values optimization model, wherein the disparity values optimization model and the second disparity values optimization model comprise separate optimizations.

8. The method of claim 7, wherein the resultant approximated disparity values and the second resultant approximated disparity values are generated in parallel.

9. The method of claim 1, wherein the initial disparity map comprises a second hole region, the method further comprising:
generating second resultant approximated disparity values for at least second selected grid nodes of the disparity value approximation grid within the second hole region of the initial disparity map based on the disparity values optimization model, wherein the disparity values optimization model comprises an optimization based on the selected grid nodes and the second selected grid nodes.

10. The method of claim 1, wherein the initial disparity map comprises a pixel resolution disparity map and the disparity value approximation grid comprises grid nodes separated by not less than two pixels.

11. A system for filling holes in a disparity map comprising:
a memory configured to receive an initial disparity map having a hole region and a contour region circumscribing the hole region; and
a processor coupled to the memory, the processor to provide a disparity value approximation grid having a lower resolution than the initial disparity map and comprising a plurality of grid nodes and a plurality of grid cells between respective grid nodes for the initial disparity map, to determine, from the disparity value approximation grid, selected grid nodes comprising only those grid nodes within the hole region or having a portion of the contour region adjacent thereto, the selected grid nodes comprising multiple first grid nodes defining a first grid cell therebetween, the first grid cell having a portion of the contour region therein, to generate a disparity values optimization model comprising an approximated disparity value for each of the selected grid nodes, wherein the disparity values optimization model comprises a sum of a disparity difference term and a smoothness term, wherein the disparity difference term comprises differences between disparity values from the initial disparity map and weighted averages of approximated disparity values of the first grid nodes for only those coordinate positions in the first grid cell included in the contour region while disparity values from the initial disparity map are excluded from the disparity difference term for coordinate positions in the first grid cell not included in the contour region, and wherein the smoothness term comprises differences between approximated disparity values of the selected grid nodes, to generate a resultant approximated disparity values for each of the approximated disparity values based on an optimization of the disparity values optimization model, and to fill the hole region with upsampled approximated disparity values based on the resultant approximated disparity values to generate a final disparity map.

12. The system of claim 11, wherein the processor is further to generate the contour region circumscribing the hole region by the processor being configured to detect a hole region boundary of the hole region, to render the hole region boundary onto a bitmap, and to modify at least one rendered value within the hole region.

13. The system of claim 12, wherein the processor is further to generate a hole mask based on the initial disparity map, and wherein the processor is to detect the hole region boundary based on the hole mask and to clear the at least one value based on the hole mask.

14. The system of claim 11, wherein the smoothness term comprises a sum of squared differences between the approximated disparity values.

15. The system of claim 11, wherein the disparity difference term comprises a sum of squares of each difference between the disparity value from the initial disparity map and the weighted average of approximated disparity values of the first grid nodes.

16. The system of claim 11, wherein the initial disparity map comprises a second hole region, and wherein the processor is to generate second resultant approximated disparity values for at least second grid nodes of the disparity value approximation grid within the second hole region of the initial disparity map based on a second disparity values optimization model, wherein the disparity values optimization model and the second disparity values optimization model comprise separate optimizations.

17. The system of claim 11, wherein the initial disparity map comprises a second hole region, and wherein the processor is to generate second resultant approximated disparity values for at least second grid nodes of the disparity value approximation grid within the second hole region of the initial disparity map based on the disparity values optimization model, wherein the disparity values optimization model comprises an optimization based on the grid nodes within the hole region and the second grid nodes within the second hole region.

18. The system of claim 11, wherein the initial disparity map comprises a pixel resolution disparity map and the disparity value approximation grid comprises grid nodes separated by not less than two pixels.

19. At least one non-transitory machine readable medium comprising a plurality of instructions that, in response to being executed on a device, cause the device to fill holes in a disparity map by:
 providing, for an initial disparity map having a hole region and a contour region circumscribing the hole region, a disparity value approximation grid having a lower resolution than the initial disparity map and comprising a plurality of grid nodes and a plurality of grid cells between respective grid nodes;
 determining, from the disparity value approximation grid, selected grid nodes comprising only those grid nodes within the hole region or having a portion of the contour region adjacent thereto, the selected grid nodes comprising multiple first grid nodes defining a first grid cell therebetween, the first grid cell having a portion of the contour region therein;
 generating a disparity values optimization model comprising an approximated disparity value for each of the selected grid nodes, wherein the disparity values optimization model comprises a sum of a disparity difference term and a smoothness term, wherein the disparity difference term comprises differences between disparity values from the initial disparity map and weighted averages of approximated disparity values of the first grid nodes for only those coordinate positions in the first grid cell included in the contour region while disparity values from the initial disparity map are excluded from the disparity difference term for coordinate positions in the first grid cell not included in the contour region, and wherein the smoothness term comprises differences between approximated disparity values of the selected grid nodes;
 generating a resultant approximated disparity values for each of the approximated disparity values by optimizing the disparity values optimization model; and
 filling the hole region with upsampled approximated disparity values based on the resultant approximated disparity values to generate a final disparity map.

20. The machine readable medium of claim 19, the machine readable medium comprising further instructions that, in response to being executed on the device, cause the device to fill holes in the disparity map by:
 generating the contour region circumscribing the hole region by:
  detecting a hole region boundary of the hole region;
  rendering the hole region boundary onto a bitmap; and
  modifying at least one rendered value within the hole region.

21. The machine readable medium of claim 19, wherein the smoothness term comprises a sum of squared differences between the approximated disparity values.

22. The machine readable medium of claim 19, wherein the disparity term comprises a sum of squares of each difference between the disparity value from the initial disparity map and the weighted average of approximated disparity values of the first grid nodes.

23. The machine readable medium of claim 19, wherein the initial disparity map comprises a second hole region and the machine readable medium comprises further instructions that, in response to being executed on the device, cause the device to fill holes in the disparity map by:
 generating second resultant approximated disparity values for at least second grid nodes of the disparity value approximation grid within the second hole region of the initial disparity map based on a second disparity values optimization model, wherein the disparity values optimization model and the second disparity values optimization model comprise separate optimizations.

24. The machine readable medium of claim 19, wherein the initial disparity map comprises a second hole region and the machine readable medium comprises further instructions that, in response to being executed on the device, cause the device to fill holes in the disparity map by:
 generating second resultant approximated disparity values for at least second selected grid nodes of the disparity value approximation grid within the second hole region of the initial disparity map based on the disparity values optimization model, wherein the disparity values optimization model comprises an optimization based on the selected grid nodes and the second selected grid nodes.

25. The machine readable medium of claim 19, wherein the initial disparity map comprises a pixel resolution disparity map and the disparity value approximation grid comprises grid nodes separated by not less than two pixels.

* * * * *